(12) United States Patent
Ohara

(10) Patent No.: US 8,416,703 B2
(45) Date of Patent: Apr. 9, 2013

(54) NETWORK MANAGEMENT

(75) Inventor: Kiyotaka Ohara, Aichi-ken (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1628 days.

(21) Appl. No.: 11/237,780

(22) Filed: Sep. 29, 2005

(65) Prior Publication Data
US 2006/0067224 A1 Mar. 30, 2006

(30) Foreign Application Priority Data

Sep. 30, 2004 (JP) ................................. 2004-289129

(51) Int. Cl.
*H04L 12/26* (2006.01)
(52) U.S. Cl. ........................................ 370/252; 709/223
(58) Field of Classification Search .................... None
See application file for complete search history.

(56) References Cited

U.S. PATENT DOCUMENTS

| 7,640,342 | B1 * | 12/2009 | Aharoni et al. | 709/226 |
|---|---|---|---|---|
| 2003/0115367 | A1 | 6/2003 | Ohara | |
| 2004/0122999 | A1 * | 6/2004 | Okuyama et al. | 710/52 |
| 2004/0133553 | A1 * | 7/2004 | Suto | 707/1 |
| 2005/0021438 | A1 * | 1/2005 | Tezuka et al. | 705/36 |
| 2006/0089946 | A1 * | 4/2006 | Schumacher | 707/102 |
| 2006/0168244 | A1 * | 7/2006 | Anderson et al. | 709/227 |

FOREIGN PATENT DOCUMENTS

| JP | 2000-078169 A | 3/2000 |
|---|---|---|
| JP | 2000-194513 A | 7/2000 |
| JP | 2002-132601 A | 5/2002 |
| JP | 2003-188900 A | 7/2003 |
| JP | 2004-013718 A | 1/2004 |
| JP | 2004-199443 A | 7/2004 |
| JP | 2004-206223 A | 7/2004 |

OTHER PUBLICATIONS

Notification of Reasons of Rejection dated Jul. 31, 2007 in Japanese Application No. 2004-289129 and English translation thereof.

* cited by examiner

*Primary Examiner* — Kevin C Harper
*Assistant Examiner* — Rhonda Murphy
(74) *Attorney, Agent, or Firm* — Banner & Witcoff, Ltd.

(57) ABSTRACT

A computer program product comprises computer-readable instructions that cause a network management device (selected from one or more devices including one or more configured devices to which usage parameters necessary for using functions available via a network have already been set) to execute a process for managing the usage parameters comprising: a parameter acquisition step of acquiring one or more usage parameters already set to one of the configured devices from the configured device; and a candidate reporting step of reporting the usage parameters acquired in the parameter acquisition step as candidates for one or more usage parameters to be set to a setting target device which is connected to the network management device to be capable of data communication via a network and needing the setting of the usage parameters.

18 Claims, 13 Drawing Sheets

NETWORK MANAGEMENT

CROSS REFERENCE TO RELATED APPLICATION

This application claims priority from Japanese Patent Application No. 2004-289129, filed on Sep. 30, 2004, the entire subject matters of the application are incorporated herein by reference thereto.

BACKGROUND

1. Technical Field

Aspects of illustrative embodiments relate to a system, device method and program for network management and, in particular, to techniques for setting parameters necessary for using functions available via a network.

2. Related Art

In order to use a network device (hereinafter simply referred to as a "device") by connecting the device to a network, various parameters have to be set properly. Some of the parameters can be automatically set according to a prescribed signal protocol, without the need for direct input (manual input) by a user. Specifically, device identification information (e.g. IP address) on a network can be delivered from a server on the network (e.g. DHCP (Dynamic Host Configuration Protocol) server) and set as the identification information of the device itself.

However, presently, few DHCP servers operate to set automatically all the parameters necessary for using functions available via a network (hereinafter referred to as "usage parameters"), and thus parameters that can not be set automatically have to be set by each user by manual.

In recent years, network management programs capable of realizing a process for allowing a device on a network to set the usage parameters of another device newly connected to the network by means of remote control (the so-called "remote setup") have come into wide use. By such network management programs, the setting of the usage parameters is facilitated even for devices (printers, etc.) having no operating panel for receiving various operations by the user.

However, even with such network management programs, the users are required to carry out the input operation while correctly recognizing parameters to be inputted. Therefore, the setting of the usage parameters is still not easy for users without sufficient knowledge of the parameter settings.

Recently, in order to facilitate the tasks of inputting the usage parameters, techniques have been proposed for obtaining communication data circulating on a network, identifying a parameter (network address) to be set to the device by analyzing the obtained communication data, and reporting (displaying) the parameter as a candidate for the setting (and also setting the parameter to the device) (e.g. Japanese Patent Provisional Publication No. 2000-194513). Since such a technique is capable of finding and reporting candidates for the parameters to be set to the device, the user can input and set the parameters properly by performing a simple operation for inputting the parameters based on the reported candidates.

However, while the above patent document discloses a technique for identifying information (network addresses) regarding the source and destination of communication data by analyzing the communication data and reporting the identified information, no technique for identifying other parameters is described nor suggested in the patent document.

Since various functions have become available via networks in recent years, it is desirable that parameters necessary for using such functions (available via a network) can be inputted and set to a device with ease.

SUMMARY

According to at least some aspects, there is provided a technique capable of facilitating the operation for setting the usage parameters (necessary for using functions available via a network), which resolve the above problems.

BRIEF DESCRIPTION OF THE DRAWINGS

FIG. 10A is a schematic diagram showing a group input screen displayed in the PC search process in accordance with.

DETAILED DESCRIPTION

Figure 1:
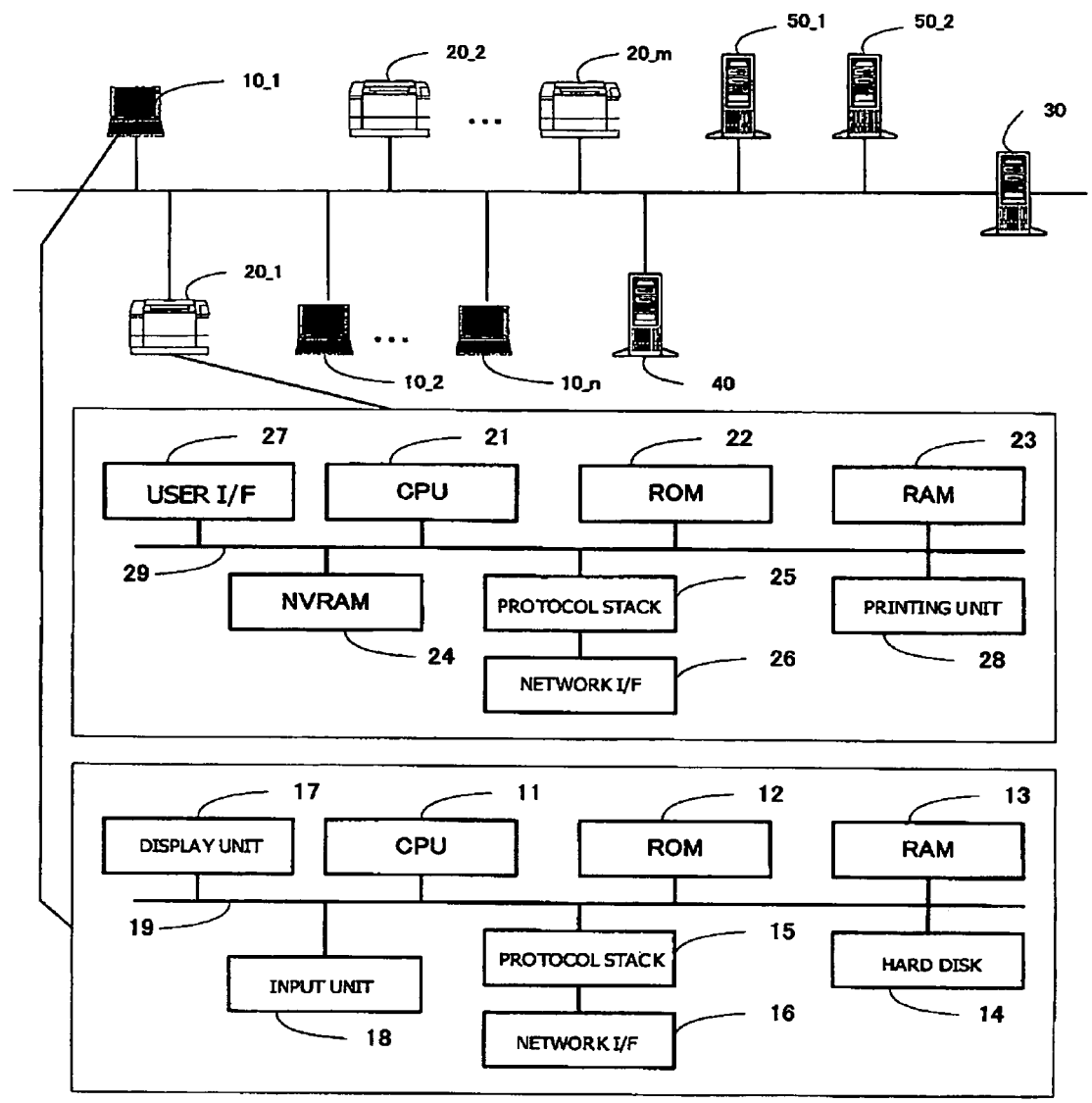
FIG. 1 is a schematic diagram showing the configuration of a network system employing a network management program in accordance with an illustrative embodiment.

It is noted that various connections are set forth between elements in the following description. It is noted that these connections in general and, unless specified otherwise, may be direct or indirect and that this specification is not intended to be limiting in this respect.

General Overview

In accordance with aspects of the illustrative embodiments, there may be provided a computer program product comprising computer-readable instructions that may cause a network management device, selected from one or more devices including one or more configured devices to which usage parameters necessary for using functions available via a network have already been set, to execute a process for managing the usage parameters comprising: a parameter acquisition step of acquiring one or more usage parameters already set to one of the configured devices from the configured device; and a candidate reporting step of reporting the usage parameters acquired in the parameter acquisition step as candidates for one or more usage parameters to be set to a setting target device, which may be connected to the network management device to be capable of data communication via a network and needing the setting of the usage parameters.

The device (network management device) controlled by the above network management program is capable of reporting the candidate usage parameters (candidates for the usage parameters to be sent to and set on the setting target device) in the parameter acquisition step. The usage parameters reported in the parameter acquisition step are parameters acquired from the configured device in the parameter acquisition step, that is, usage parameters that have actually been set on the configured device. Therefore, usage parameters identified by the network management program as parameters actually used for using the functions can be reported with reliability and accuracy.

The usage parameters reported in the parameter acquisition step are those that have actually been set to the configured device as mentioned above. Therefore, by setting the usage parameters to the setting target device, the functions usable with the parameters can securely be made available.

In order to actually set the usage parameters to the setting target device after the reporting of the usage parameters in the candidate reporting step, the network management program may be configured as below.

The process may further comprise: an input and instruction step that may allow a user to input the usage parameters to be set to the setting target device and issue a setting instruction for instructing the setting target device to set the usage parameters thereto; and a setting instruction step executed when the setting instruction is issued in the input and instruction step, of instructing the setting target device to set the usage parameters inputted before the issuance of the setting instruction. In this case, the usage parameters acquired in the parameter acquisition step may be reported in the candidate reporting step as candidates for the usage parameters to be inputted by the user in the input and instruction step.

By the above configuration, it is possible to instruct the setting target device to set the usage parameters (inputted in the input and instruction step) to itself. Since the usage parameters as the candidates are reported by the candidate reporting step when the user inputs the usage parameters and issues the setting instruction in the input and instruction step, the user is allowed to issue the setting instruction while inputting the reported usage parameters just as they are.

The input and instruction step in the above configuration is a step for the inputting of the usage parameters and the issuance of the setting instruction. The methods of the inputting of the usage parameters and the issuance of the setting instruction are not particularly limited. As an example of the inputting method, it is possible to let a display unit of the network management device display a setting screen including input fields for inputting usage parameters and let the user input the usage parameters in the input fields by operating an operating unit (input unit) of the network management device. For implementing the method, the aforementioned steps may be configured as below.

The input and instruction step may display a setting screen, including input fields for inputting the usage parameters, on a display unit of the network management device. The setting instruction step may transmit instruction data, instructing the setting target device to set the usage parameters (inputted to the input fields) thereto, to the setting target device when an operation designating the setting of the inputted usage parameters to the setting target device may be performed by the user after the setting window is displayed by the input and instruction step. The candidate reporting step may execute the reporting of the candidates by allowing the setting screen displayed in the input and instruction step to have an appearance indicating that the usage parameters acquired in the parameter acquisition step are the candidates for the usage parameters to be inputted to the input fields. The appearance may be the same as or different from other parameters (for example, different colors, shapes, fonts, font modifiers, additional characters, and the like).

By the above configuration, the user can input usage parameters in the input fields on the setting screen displayed by the input and instruction step and instruct the setting target device to set the inputted usage parameters thereto by performing the operation designating the setting through the operating unit.

Incidentally, devices connected to a network are generally configured to be able to use a plurality of functions available via the network, such as a function of transmitting and receiving e-mails (necessary usage parameters include identification information (IP address) of a mail server), a function of determining identification information of another device communicating with the device based on a domain name (necessary usage parameters include identification information of a DNS (Domain Name System) server), and a function of communicating with an external network (necessary usage parameters include identification information of a gateway). The setting screen employed in such devices generally includes a plurality of screens (corresponding to different functions), which are switched in response to selecting operation by the user, and usage parameters for each function can be set on each corresponding screen.

In such a configuration, the parameter acquisition step may acquire a plurality of usage parameters from the configured device and the candidate reporting step may let each setting screen (each screen of the setting screen) have an appearance that reports corresponding ones of the usage parameters as the candidates. However, such a configuration can not offer high operability since the user hoping to check the candidate usage parameters corresponding to another function has to switch the setting screen to another screen, that is, the user has to successively switch the setting screens in order to check all the usage parameters acquired from the configured device.

Therefore, in one embodiment, a plurality of usage parameters already set to the configured device may be acquired in the parameter acquisition step, and a setting screen including input fields for inputting the usage parameters acquired in the parameter acquisition step may be displayed on the display unit in the input and instruction step.

By the above configuration, the setting screen is displayed in the input and instruction step as a single screen having the input fields for inputting the usage parameters acquired from the configured device. Since the candidate reporting step lets the single screen have an appearance indicating that the usage parameters acquired from the configured device are the candidates for the usage parameters to be inputted to the input fields, the user can easily check all the candidate usage parameters at a glance without the need of switching the screen, by which high operability can be offered to the user.

Further, since the setting screen (single screen) has all the input fields for inputting the reported candidates, the operation of inputting the usage parameters to corresponding input fields can be carried out with ease, by which still higher operability is provided to the user.

As for the aforementioned setting target device, a possibility exists that usage parameters corresponding to the usage parameters acquired from the configured device have already been set in the setting target device. In this case, if the usage parameters acquired from the configured device are directly set in the setting target device, functions that have been already available in the setting target device can be disabled. In order to avoid such trouble, it is desirable that the usage parameters already set in the setting target device can be identified and the identified usage parameters can be recognized by the user.

For this purpose, the process may further comprise a setting inquiry step of inquiring of the setting target device whether each usage parameter has been set thereto or not and about the already set usage parameters. In this case, the input and instruction step may allow the user to perform the inputting of the usage parameters and the issuance of the setting instruction in a mode capable of specifying whether or not each usage parameter to be inputted by the user may be confirmed by the inquiry of the setting inquiry step to have already been set to the setting target device.

By the above configuration, the input and instruction step can be executed in a mode corresponding to the result of the inquiry of the setting inquiry step, that is, in a mode specifying whether or not each usage parameter has already been set to the setting target device. Therefore, the user is allowed to execute the inputting of the usage parameters and the issuance of the setting instruction while clearly recognizing whether or not each usage parameter to be inputted has already been set to the setting target device, by which the aforementioned trouble can be minimized or prevented from occurring.

The "mode capable of specifying whether or not each usage parameter has already been set to the setting target device" can be implemented, for example, by displaying information indicating whether each usage parameter has already been set or not on the display unit of the network management device. In the case where the input and instruction step is configured to display the setting screen (including the input fields for inputting the usage parameters) on the display unit, the setting screen may be displayed with the input fields previously filled with the usage parameters already set to the setting target device.

In the above configuration, executing the input and instruction step in the mode specifying whether each usage parameter has already been set to the setting target device or not, the reporting of the candidates in the candidate reporting step may be executed irrespective of whether each usage parameter has already been set or not. However, the candidate reporting step may also be configured to report the candidates only for usage parameters that have not been set to the setting target device yet.

For this configuration, the candidate reporting step may be configured to report the usage parameters acquired in the parameter acquisition step and confirmed by the inquiry of the setting inquiry step to have not been set to the setting target device yet as the candidates for the usage parameters to be set to the setting target device when the input and instruction step may allow the user to input the usage parameters.

By the above configuration, it becomes possible to let the candidate reporting step execute the reporting of the candidates only for the usage parameters confirmed to have not been set to the setting target device.

In this configuration, the usage parameters reported by the candidate reporting step are those confirmed to have not been set to the setting target device. Therefore, if the parameter acquisition step is configured to acquire only usage parameters confirmed to have not been set to the setting target device, the usage parameters reported by the candidate reporting step are all the usage parameters acquired in the parameter acquisition step. Meanwhile, if the parameter acquisition step is configured to acquire usage parameters irrespective of whether or not each usage parameter has already been set or not, the usage parameters reported by the candidate reporting step are usage parameters extracted from the acquired usage parameters as those confirmed to have not been set to the setting target device.

While the method of the reporting of the candidates in the candidate reporting step is not particularly limited as long as the usage parameters as the candidates can be reported, it is possible, for example, to display the candidate usage parameters on the display unit. Specifically, in a configuration allowing the user to input each usage parameter into an input field, each candidate usage parameter may be displayed in a display area in the vicinity of the input field.

With such a configuration, the user can perform the operation for inputting the usage parameter (for example, manual input of the parameter, copy & paste of the displayed usage parameter, etc.) correctly while checking the usage parameter displayed in the display area.

It is also possible to configure the candidate reporting step to report each usage parameter acquired in the parameter acquisition step in a state in which the usage parameter can be selectively inputted automatically in response to an operation by the user when the input and instruction step may allow the user to input the usage parameter.

By the above configuration, the user can let each candidate usage parameter be selectively inputted (or not inputted) automatically, without the need of directly (manually) inputting the usage parameter, by which the usage parameters acquired from the configured device can be inputted easily and correctly.

In the above configuration, the "state in which the usage parameter can be selectively inputted automatically" can be implemented in various ways. For example, in a configuration allowing the user to input each usage parameter into an input field, a button may be displayed in the vicinity of the input field and the usage parameter may be automatically entered in the input field when the user performs and operation for selecting the button (pressing the button, clicking the button, etc., hereinafter simply referred to as "pressing" the button). It is also possible to let the user make the selection (whether or not to let the input field be filled with the usage parameter) from a pull-down menu or other input technique including radio buttons and the like.

The method of the reporting the candidates in the candidate reporting step can also be configured as below. The candidate reporting step may report one or more usage parameters acquired in the parameter acquisition step in a state in which the user can perform an operation for automatically inputting the usage parameters collectively when the input and instruction step may allow the user to input the usage parameters.

By the above configuration, the user can let all the candidate usage parameters be automatically inputted (or not inputted), without the need of inputting each of the usage parameter, by which the usage parameters acquired from the configured device can be inputted easily and correctly.

In this configuration, the "operation for automatically inputting the usage parameters collectively" can be any "prescribed operation" (e.g. pressing a button displayed on the display unit). For example, in a configuration allowing the user to input the usage parameter into input fields, the pressing of the button displayed on the display unit lets the usage parameters acquired from the configured device be automatically entered in the corresponding input fields.

The network management device (device controlled by the network management program) may be any device selected from the one or more devices (including one or more configured devices); therefore, it is possible to select one of the configured devices as the network management device. In this case, the parameter acquisition step may be configured to acquire one or more usage parameters already set to (stored in a prescribed storage area of) itself.

For this, the parameter acquisition step may be configured to acquire the one or more usage parameters by reading out the usage parameters already set to the network management device from a storage area storing the usage parameters.

By the above configuration, the usage parameters already set to the network management device itself can be reported with reliability and accuracy as the candidates for the usage parameters to be set to the setting target device.

When a device that is not a configured device is selected as the network management device, the parameter acquisition step may inquire of a configured device usage parameters already set thereto and acquire the usage parameters sent back in response to the inquiry.

For this, the parameter acquisition step may be configured to request a device other than the network management device to send back one or more usage parameters already set to the device and acquire the usage parameters sent back in response to the request (or identify the usage parameters based on information sent back in response to the request).

By the above configuration, the usage parameters already set to the device other than the network management device can be reported with reliability and accuracy as the candidates for the usage parameters to be set to the setting target device.

In the above two configurations (network management programs), the procedure of the parameter acquisition step varies depending on whether the network management device is a configured device or not, by which two network management programs (having the same purpose of reporting the usage parameters) become necessary due to the difference of the source of the usage parameters. For practical use, it is preferable that a configured device as the source of the usage parameters can arbitrarily be selected by the user in order to eliminate the need of preparing different network management programs for different types of devices.

Specifically, the process may further comprise a first source designation step that may allow the user to designate the network management device or a device other than the network management device as a source of the usage parameters acquired in the parameter acquisition step. In this case, if the user designates that the network management device should be selected as the source in the first source designation step, the parameter acquisition step may acquire the one or more usage parameters by reading out the usage parameters from a storage area of the network management device. Meanwhile, if the user designates that a device other than the network management device should be selected as the source in the first source designation step, the parameter acquisition step may request a device other than the network management device to send back one or more usage parameters already set to the device and acquires the usage parameters sent back in response to the request.

By the above configuration, the user can arbitrarily designate whether the source of the usage parameters should be the network management device or a device other than the network management device. The usage parameters can be acquired in the parameter acquisition step by a procedure corresponding to the type of the designated device, by which the need of preparing different network management programs for different types of devices can be eliminated.

When the usage parameters are acquired from a device other than the network management device as above, it is desirable that the user can also designate the device as the source of the usage parameters.

For this purpose, the process may further comprise a second source designation step that may allow the user to designate a device connected to the network management device to be capable of data communication via a network as the source of the usage parameters acquired in the parameter acquisition step.

By the above configuration, the usage parameters may be acquired from a device arbitrarily designated by the user as the configured device.

In this configuration, the process may further comprise a device search step of searching for other devices connected to the network management device to be capable of data communication via a network, and the second source designation step may let the user designate the device as the source of the usage parameters from devices found by the device search step.

By the above configuration, the device as the configured device (source) is designated by the user necessarily from devices connected to the network management device to be capable of data communication via a network, by which the user is prevented from erroneously designating a device incapable of data communication.

While the device searching step may search for all devices connected to the network management device to be capable of data communication, the device searching step may also be configured to search for devices belonging to a specific group in cases where the devices are classified in regard to work groups, device names, broadcast domains, etc.

Specifically, when the devices connected to the network management device to be capable of data communication via a network are classified into groups according to a prescribed standard, the device searching step may be configured to search for devices belonging to a specific group out of the devices connected to the network management device to be capable of data communication via a network.

By the above configuration, the targets of search can be narrowed down into a specific group, by which detection of an unnecessarily large number of devices can be prevented.

Incidentally, any device connected to the network management device to be capable of data communication via a network may be selected as the aforementioned setting target device. Therefore, the process may further comprise a target designation step that may allow the user to designate a device connected to the network management device to be capable of data communication via a network as the setting target device. By such a configuration, a device arbitrarily designated by the user may be selected as the setting target device.

In this configuration, the process may further comprise a target device searching step of searching for other devices connected to the network management device to be capable of data communication via a network. In this case, the target designation step may allow the user to designate the setting target device from devices found by the target device searching step. By the above configuration, the device as the setting target device may be designated by the user necessarily from devices connected to the network management device to be capable of data communication via a network, by which the user may be prevented from erroneously designating a device incapable of data communication.

Each network management program described above, made of a sequence of instructions (suitable for processing by a computer) arranged in a proper order, can be provided to a device or a user of the device via a record medium (FD, CD-ROM, memory card, etc.) or a communication line/network (e.g. the Internet). Each network management program may also be provided to a user by pre-installing the program in a hard disk or memory of a device.

In accordance with another aspect of the present invention, there may be provided a network management device executing a process for managing usage parameters necessary for using functions available via a network. The process may comprise: a parameter acquisition step of acquiring one or more usage parameters already set to a configured devices from the configured device; and a candidate reporting step of reporting the usage parameters acquired in the parameter acquisition step as candidates for one or more usage parameters to be set to a setting target device, which may be connected to the network management device to be capable of data communication via a network and needing the setting of the usage parameters.

In accordance with another aspect of the present invention, there may be provided a network management system comprising: a network management device executing a process for managing usage parameters necessary for using functions available via a network; and a setting target device to which the one or more usage parameters are set by the network management device. The process for managing usage parameters may include a parameter acquisition step of acquiring one or more usage parameters already set to a configured device from the configured device and a candidate reporting step of reporting the usage parameters acquired in the parameter acquisition step as candidates for one or more usage parameters to be set to another device, which may be connected to the network management device to be capable of data communication via a network and needing the setting of the usage parameters.

In accordance with another aspect of the present invention, a network management method for a network management device (selected from one or more devices including one or more configured devices to which usage parameters necessary for using functions available via a network have already been set) for managing the usage parameters may be provided comprising: a parameter acquisition step of acquiring one or more usage parameters already set to one of the configured devices from the configured device; and a candidate reporting step of reporting the usage parameters acquired in the parameter acquisition step as candidates for one or more usage parameters to be set to a setting target device, which may be connected to the network management device to be capable of data communication via a network and needing the setting of the usage parameters.

According to further aspects, there is provided a computer program containing instructions that cause a network management device, selected from one or more devices including one or more configured devices to which usage parameters necessary for using functions available via a network have already been set, to perform a process for managing the usage parameters when executed by the computer. The process may be provided with: a parameter acquisition step of acquiring one or more usage parameters already set to one of the configured devices from the configured device; and a candidate reporting step of reporting the usage parameters acquired in the parameter acquisition step as candidates for one or more usage parameters to be set to a setting target device which is connected to the network management device to be capable of data communication via a network and needing the setting of the usage parameters.

Embodiments

Referring now to the drawings, a description will be given in detail of an illustrative embodiments.

FIG. 1 is a schematic diagram showing the configuration of a network system employing a network management program in accordance with an embodiment of the present invention. In the network system of FIG. 1, a plurality of personal computers (hereinafter referred to as "PCs") 10 (10_1-10_n), a plurality of printers 20 (20_1-20_m), a gateway 30, a mail server 40, a primary DNS (Domain Name System) server 50_1, a secondary DNS server 50_2, etc. may be connected together by a network and able to communicate data.

Each PC 10 is a well-known computer system including a CPU (Central Processing Unit) 11, a ROM (Read Only Memory) 12, a RAM (Random Access Memory) 13, a hard disk 14, a protocol stack 15, a network interface (network I/F) 16, a display unit 17, an input unit 18, etc., which are connected by a bus 19. Each PC 10 is connected to the network via the network I/F 16 and functions as a network device. It is appreciated that the CPU is a generalized recitation of a processor. The processor may include multiple core processing units and the like or even a network of processing units.

While the protocol stack 15 is shown in FIG. 1 as a component connecting the network I/F 16 to the bus 19, the protocol stack 15 in FIG. 1 is only a symbol conceptualizing a state in which data communication by the network I/F 16 is realized by processes according to the protocol stack 15. Actually, the protocol stack 15 is a program module installed (stored) in the hard disk 14 for implementing data communication according to both IPv4 (Internet Protocol version 4) and IPv6 (Internet Protocol version 6).

To each PC 10, various parameters have been set. The parameters set to each PC 10 include an IP address assigned to the PC 10 for identifying the PC 10 on the network, IP addresses of the mail server 40 (an SMTP (Simple Mail Transfer Protocol) server address and a POP (Post Office Protocol) server address), IP addresses of the DNS servers 50, an address of the gateway 30 (the so-called "default gateway"), a language used in (the OS (Operating System) of) the PC 10, an area in which the PC 10 is used (an area as the basis of the time zone), a user name, communication standards (protocols) supported by the PC 10, etc. These are parameters necessary for using functions (communication, mail transmission/reception, name resolution, display of a language, setting of the time zone, identification of a user of the PC 10, determination of a supported communication standard, etc.) available via the network (hereinafter referred to as "usage parameters").

Among the PCs 10, the PC 10-1 is equipped with a network management program for executing various processes, which will be explained later. Each printer 20 is a well-known network printer including a CPU 21, a ROM 22, a RAM 23, an NVRAM (Non Volatile RAM) 24, a protocol stack 25, a network interface (network I/F) 26, a user interface (user I/F) 27, a printing unit 28, etc. which are connected by a bus 29. Each printer 20 is connected to the network via the network I/F 26 and functions as a network device. Again, CPU 21 is a generalized representation of a processing unit. Other processing units may be used without departing from the scope of the invention.

The protocol stack 25 is a program module stored in the NVRAM 24, similarly to the protocol stack 15 of each PC 10 explained above. To each printer 20, at least an IP address (assigned for identifying the printer 20) has been set.

The mail server 40 is a server having the functions of both an SMTP server and a POP server.

<Setting Screen Display Process by PC 10_1>

In the following, the procedure of a setting screen display process executed by (the CPU 11 of) the PC 10_1 will be described referring to a flowchart of FIG. 2. The setting screen display process is a process executed according to the aforementioned network management program.

Figure 3:
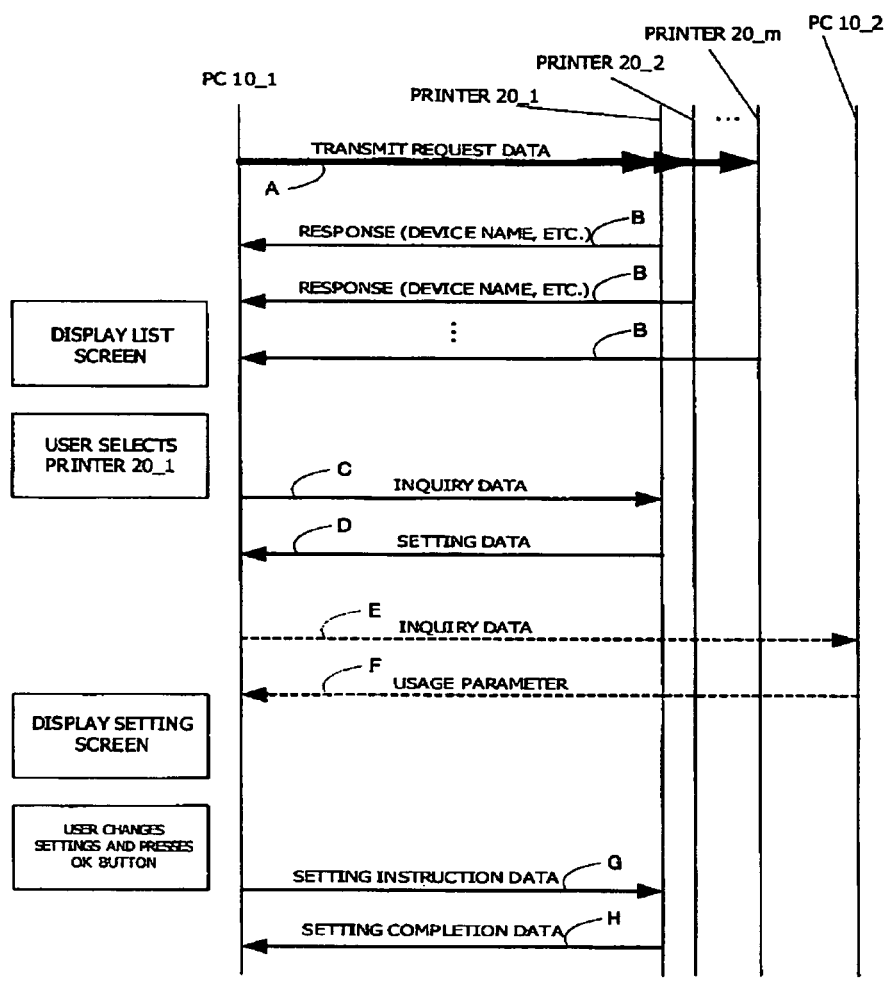
FIG. 3 is a timing chart showing data communication among devices of the network system during the setting screen display process in accordance with aspects.
Figure 4:
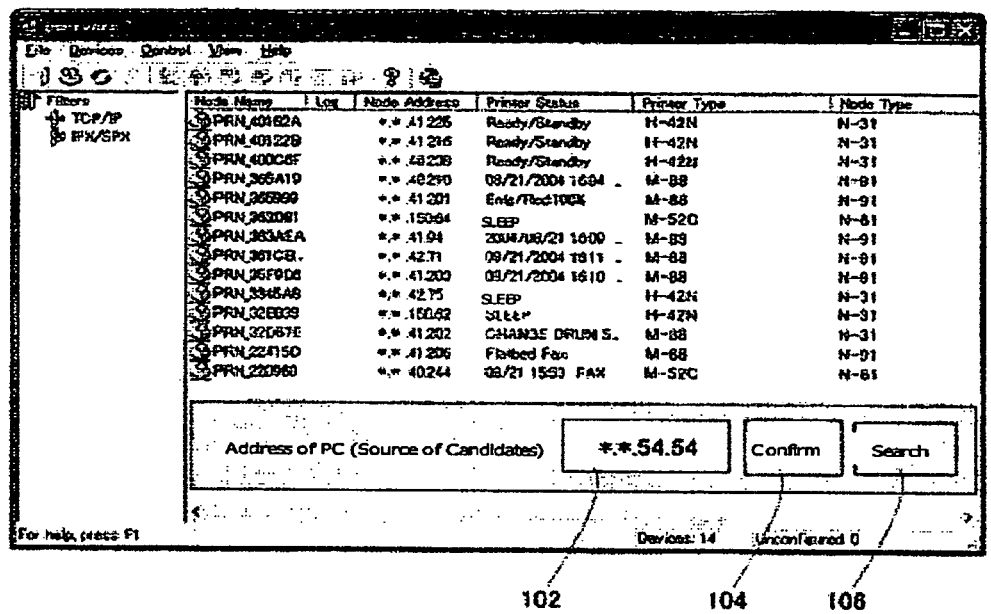
FIG. 4 is a schematic diagram showing a list screen displayed in the setting screen display process in accordance with aspects.

First, printers 20 on the network are searched for and the result of the search is displayed on the display unit 17 in the form of a list (S102). In the step S102, request data (for requesting general information) is transmitted (broadcast & multicast) to printers 20 on the network by IPv4 and IPv6 (see an arrow A in FIG. 3). The "general information" means information, which has been set to each printer 20, such as a device name of the printer 20 (Node Name), the IP address assigned to the printer 20 (Node Address) and operation status of the printer 20 (Printer Status). Information received from printers 20 in response to the request data is collected for a prescribed time period (see arrows B in FIG. 3) and thereafter a list screen in a tabular form listing the received information with respect to each printer 20 (each device name (Node Name)) is displayed on the display unit 17 as shown in FIG. 4. At the bottom of the list screen, an input field 102 (which will be used in a process explained later for inputting an IP address for directly designating a PC 10 as the source of parameters), a "Confirm" button 104 (pressed for confirming and finalizing the entry in the input field 102) and a search button 106 (pressed for searching for PCs 10 as the sources of the parameters) are arranged. After the list screen is displayed as shown in FIG. 4, the user can perform an operation for designating a printer 20 from the list through the input unit 18, an operation for inputting the IP address into the input field 102 and confirming the entry (pressing the "Confirm" button 104), an operation for searching for PCs 10 as the sources of the parameters (pressing the search button 106), etc.

After the displaying of the list screen on the display unit 17, the CPU 11 waits until an operation is performed by the user (S104: NO). When an operation by the user is detected (S104: YES), whether the operation is the pressing of the "Confirm" button 104 on the list screen or not is judged (S106). If the "Confirm" button 104 has been pressed (S106: YES), the IP address which has been inputted into the input field 102 is registered (S108) and thereafter the process returns to the step S104. The registration in the step S108 is carried out by setting the IP address (inputted into the input field 102) in a "source variable", which is stored in the hard disk 14. Incidentally, the source variable is initialized (set to "0") when the network management program is installed in the PC 10_1.

If the operation by the user after the displaying of the list screen is the pressing of the search button 106 on the list screen (S106: NO, S110: YES), a "PC search process" (explained later) is executed (S112) and thereafter the process returns to the step S104. In the PC search process of the step S112, the PC 10_1 searches for other PCs 10 capable of data communication with the PC 10_1, lets the user designate one of the PCs 10 found in the search, and registers the IP address of the designated PC 10 (sets the IP address in the source variable). The details of the PC search process will be described later.

If the operation by the user after the displaying of the list screen is an operation designating one of the printers 20 (S110: NO, S114: YES), inquiry data (inquiring setting information) is transmitted to the designated printer 20 (hereinafter referred to as a "setting target printer 20") (S116). In this step, the inquiry data is transmitted to the setting target printer 20 (see an arrow C in FIG. 3) in order to acquire the setting information of the setting target printer 20 (information corresponding to each setting screen which will be displayed in the next step S118). From the setting target printer 20 receiving the inquiry data, setting data indicating the setting information (e.g. device name) is sent back (see an arrow D in FIG. 3). In this case, if the inquired information has not been set to the setting target printer 20 yet, the setting target printer 20 sends back the setting data in a state specifying that the information has not been set yet (e.g. a void parameter). If the operation by the user after the displaying of the list screen is not the pressing of the "Confirm" button 104, the pressing of the search button 106 nor the operation designating one of the printers 20 (S114: NO), a process corresponding to the operation (other process) is executed (S117) and thereafter the process returns to the step S104.

After the setting data is received from the setting target printer 20, the setting screen, for setting the usage parameters to the setting target printer 20 (remote setup), is displayed on the display unit 17 based on the received setting data (S118). In this step, the screen displayed on the display unit 17 can be switched as shown in FIGS. 5A-7B by selecting a tab corresponding to a desired screen (the screens of FIGS. 5A-7B correspond to different tabs). In response to the selection of a tab, one of the screens of FIGS. 5A-7B (containing different input fields for inputting the usage parameters corresponding to different functions) is displayed.

Figure 5A:
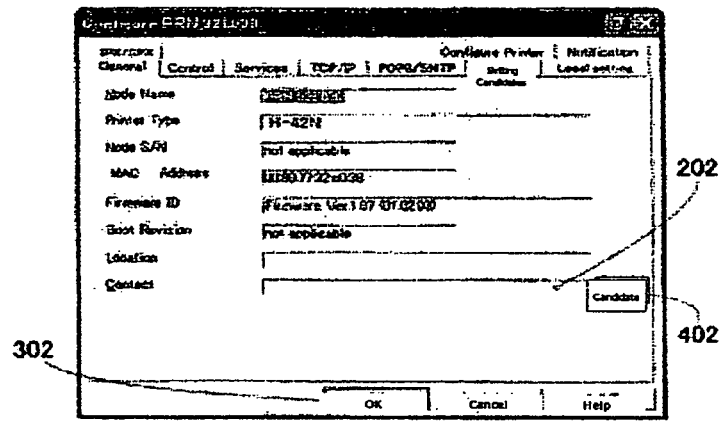
FIG. 5A is a schematic diagram showing a first screen as one of setting screens displayed in the setting screen display process in accordance with aspects.

The screens of FIGS. 5A-7B will be explained in detail below. FIG. 5A shows a first screen (for displaying information unique to the setting target printer 20), which is displayed as one of the setting screens when the step S116 is executed for the first time since the start of the setting screen display process. The first screen of FIG. 5A can also be called from other screens by selecting a "General" tab. The "information unique to the setting target printer 20" means the device name (Node Name) obtained in the step S102, a MAC address (MAC address) assigned to the interface of the setting target printer 20, etc. The first screen includes an input field 202 for inputting a user name, etc. of the setting target printer 20. By inputting a user name to the input field 202 and pressing an "OK" button on any one of the screens, the inputted user name is set to the setting target printer 20 as will be explained later. The first screen further includes a candidate button 402, which is pressed for automatically inputting a parameter (as a candidate for the entry in the input field 202) to the input field 202. Incidentally, the aforementioned "information" corresponding to the first screen includes the device name (Node Name) of the setting target printer 20, etc. The inquiry data transmitted in the step S116 inquires parameters such as the device name.

Figure 5B:
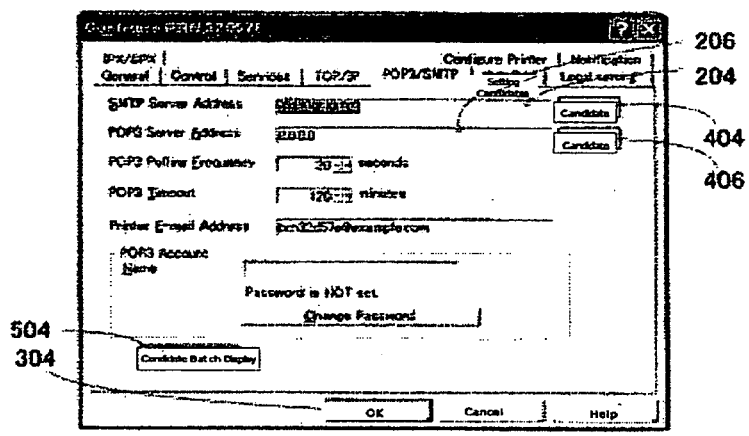
FIG. 5B is a schematic diagram showing a second screen as one of the setting screens in accordance with aspects.

FIG. 5B shows a second screen (used for setting the usage parameters regarding the transmission/reception of e-mails), which is displayed as one of the setting screens when a "POP/SMTP" tab is selected. Some of printers of recent years support a function of sending an error message, etc. to a prescribed destination by e-mail, a function of receiving an e-mail with an attached file containing print data via a network and printing out the print data attached to the e-mail (network print function), etc. For the usage of these functions, such printers are configured so that parameters regarding the transmission/reception of e-mails can be set as the usage parameters. The second screen includes input fields 204 and 206 for inputting the IP addresses of the mail server 40, which is provided on the network for realizing the functions. By inputting the IP addresses to the input fields 204 and 206 and pressing the "OK" button on any one of the screens, the inputted IP addresses are set to the setting target printer 20 as will be explained later. The second screen further includes candidate buttons 404 and 406 and a candidate batch display button 504. Each candidate button 404, 406 is pressed for automatically inputting a parameter (as a candidate for the entry in each input field 204, 206) to the input field 204, 206. The candidate batch display button 504 is pressed for automatically inputting parameters to both the input fields 204 and 206. The aforementioned "information" corresponding to the second screen includes the IP address of the mail server 40, etc. The inquiry data transmitted in the step S116 inquires parameters such as the IP address.

Figure 5C:
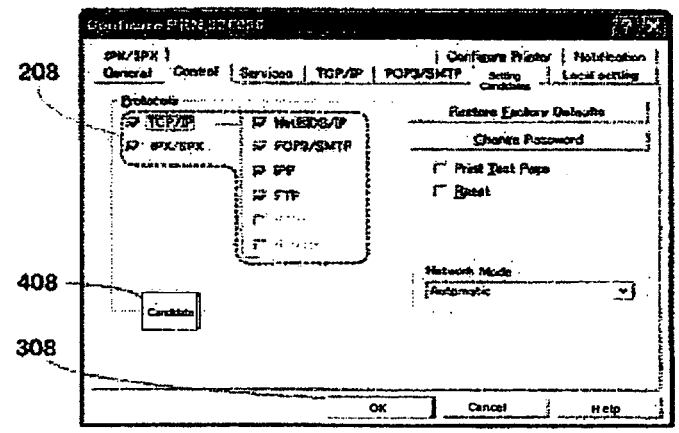
FIG. 5C is a schematic diagram showing a third screen as one of the setting screens in accordance with aspects.

FIG. 5C shows a third screen (used for setting communication standards (protocols) to be supported by the setting target printer 20), which is displayed as one of the setting screens when a "Control" tab is selected. The third screen includes an input field 208 containing check boxes used for specifying communication standards to be enabled by the setting target printer 20. By checking proper check boxes of the input field 208 and pressing the "OK" button on any one of the screens, the inputted communication standards (protocols) are set to the setting target printer 20 as will be explained later. The third screen further includes a candidate button 408, which is pressed for automatically inputting usage parameters (as candidates for the entry in the input field 208) to the input field 208. The aforementioned "information" corresponding to the third screen includes the communication standards (protocols) to be supported by the setting target printer 20, etc. The inquiry data transmitted in the step S116 inquires parameters such as the communication standards.

Figure 6A:
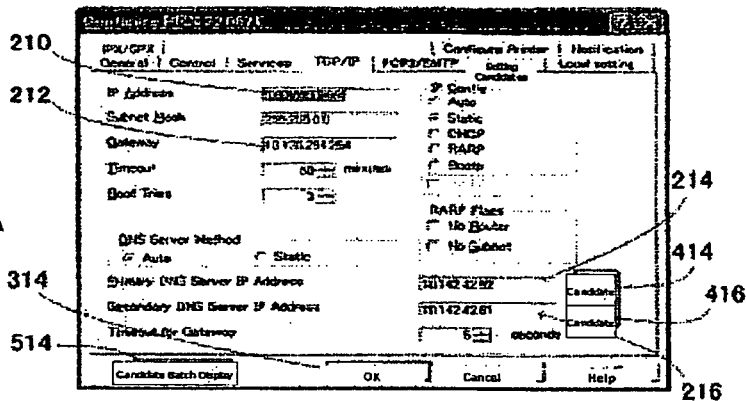
FIG. 6A is a schematic diagram showing a fourth screen as one of the setting screens in accordance with aspects.

FIG. 6A shows a fourth screen (used for setting usage parameters necessary for realizing data communication via the network), which is displayed as one of the setting screens when a "TCP/IP" tab is selected. The usage parameters necessary for realizing data communication via the network include the IP address assigned to the printer 20, the IP address of the gateway 30, the IP addresses of the DNS servers 50 (primary DNS server 50_1, secondary DNS server 50_2), etc. The fourth screen includes input fields 210-216 for inputting the aforementioned IP addresses, etc. By inputting the IP addresses and pressing the "OK" button on any one of the screens, the inputted IP addresses are set to the setting target printer 20 as will be explained later. The fourth screen further includes candidate buttons 414 and 416 and a candidate batch display button 514. Each candidate button 414, 416 is pressed for automatically inputting a usage parameter (as a candidate for the entry in each input field 214, 216) to the input field 214, 216 regarding the IP address of the primary/ secondary DNS server. The candidate batch display button 514 is pressed for automatically inputting parameters to both the input fields 214 and 216. The aforementioned "information" corresponding to the fourth screen includes the above IP addresses, etc. The inquiry data transmitted in the step S116 inquires parameters such as the IP addresses.

Figure 6B:
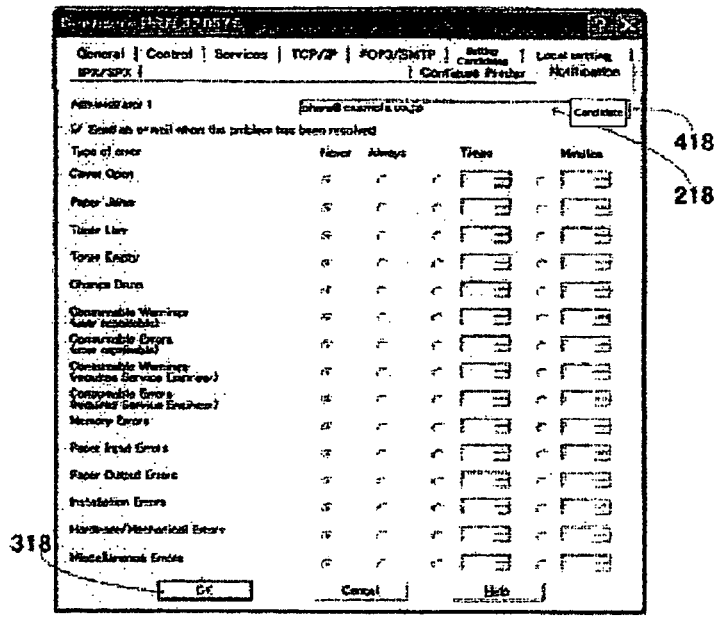
FIG. 6B is a schematic diagram showing a fifth screen as one of the setting screens in accordance with aspects.

FIG. 6B shows a fifth screen (used for setting the usage parameters regarding the "function of sending an error message, etc. to a prescribed destination by e-mail", which has been mentioned in the explanation of the second screen), which is displayed as one of the setting screens when a "Notification" tab is selected. The fifth screen includes an input field 218 for inputting a mail address as the destination of the e-mail for the notification of error, etc. By inputting the mail address to the input field 218 and pressing the "OK" button on any one of the screens, the inputted mail address is set to the setting target printer 20 as will be explained later. The fifth screen further includes a candidate button 418, which is pressed for automatically inputting a parameter (as a candidate for the entry in the input field 218) to the input field 218. The aforementioned "information" corresponding to the fifth screen includes the above mail address, etc. The inquiry data transmitted in the step S116 inquires parameters such as the mail address.

Figure 7A:
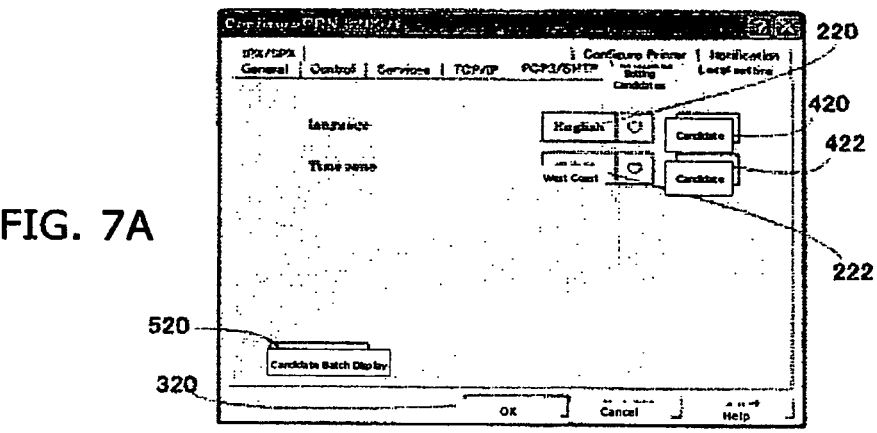
FIG. 7A is a schematic diagram showing a sixth screen as one of the setting screens in accordance with aspects.

FIG. 7A shows a sixth screen (used for setting the language used in the setting target printer 20 (Language) and the area in which the setting target printer 20 is used (Time Zone)), which is displayed as one of the setting screens when a "Local Setting" tab is selected. The sixth screen includes input fields 220 and 222 used for selecting the language and the area from pull-down menus respectively. By selecting the language and the area and pressing the "OK" button on any one of the screens, the inputted language and area are set to the setting target printer 20 as will be explained later. The sixth screen further includes candidate buttons 420 and 422 and a candidate batch display button 520. Each candidate button 420, 422 is pressed for automatically inputting a usage parameter (as a candidate for the entry in each input field 220, 222) to the input field 220, 222 (automatically selecting a candidate from each pull-down menu). The candidate batch display button 520 is pressed for automatically inputting parameters to both the input fields 220 and 222. The aforementioned "information" corresponding to the sixth screen includes the language, the area, etc. The inquiry data transmitted in the step S116 inquires parameters such as the language and the area.

Figure 7B:
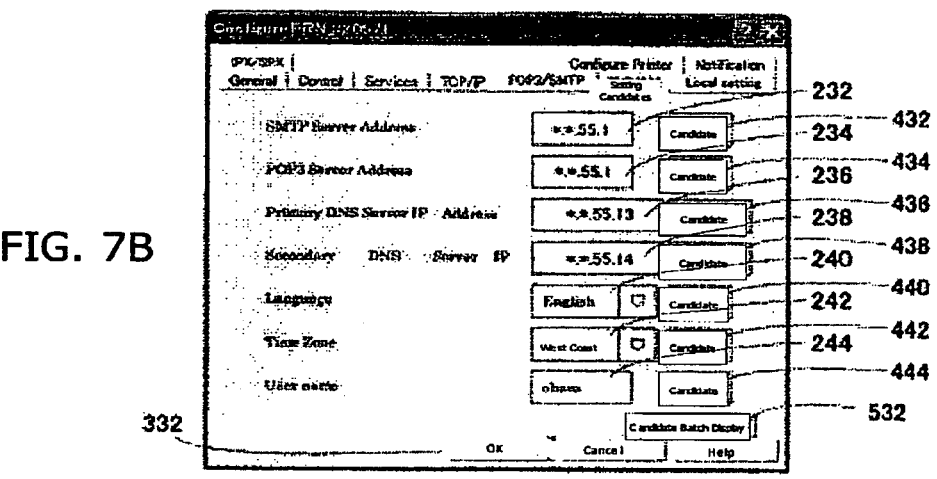
FIG. 7B is a schematic diagram showing a seventh screen as one of the setting screens in accordance with aspects.

FIG. 7B shows a seventh screen, which is displayed as one of the setting screens when a "Setting Candidates" tab is selected, on which input fields corresponding to the candidate buttons of other setting screens are summarized together with corresponding candidate buttons. The seventh screen includes input fields 232-244 corresponding to the input fields of other setting screens to which the candidate buttons are attached, candidate buttons 432-444 corresponding to the input fields 232-244, and a candidate batch display button 532 pressed for automatically inputting candidate parameters to all the input fields 232-244. By inputting proper usage parameters to the input fields 232-244 and pressing the "OK" button on any one of the screens, the inputted usage parameters are set to the setting target printer 20 as will be explained later. The aforementioned "information" corresponding to the seventh screen includes the usage parameters to be inputted to the input fields 232-244. The inquiry data transmitted in the step S116 inquires these usage parameters.

After each setting screen is displayed on the display unit 17, the user can perform an operation for selecting a tab, an operation for inputting a usage parameter to each input field, an operation for selecting a candidate button, an operation for selecting a candidate batch display button, an operation for selecting the "OK" button, etc.

After the displaying of a setting screen in the step S118, the CPU 11 waits until the input unit 18 is operated by the user (S120: NO).

When an operation by the user is detected (S120: YES), whether the operation is an entry in an input field or not is judged (S122). If the operation is an entry in an input field (S122: YES), the entry (entered parameter) is displayed (incorporated) in the input field (S124) and thereafter the process returns to the step S120.

Figure 8:
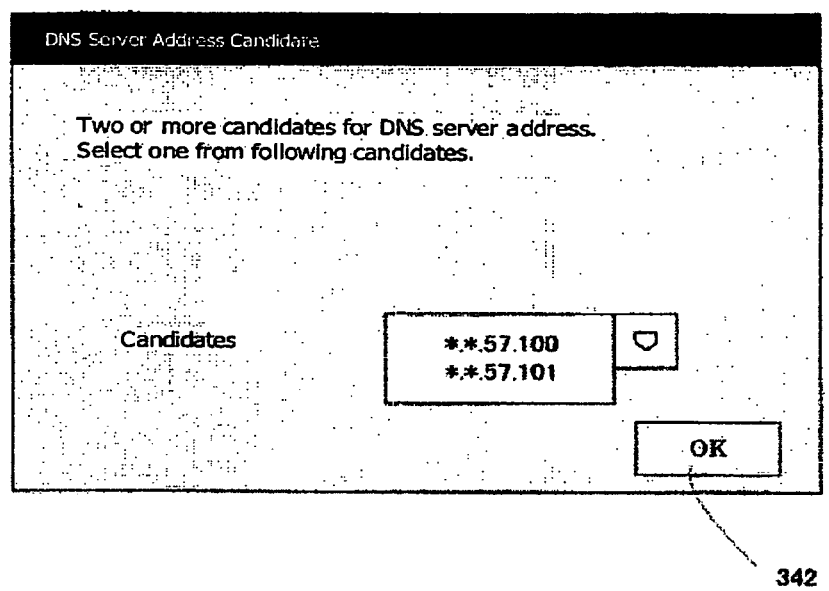
FIG. 8 is a schematic diagram showing a candidate selection screen displayed in the setting screen display process in accordance with aspects.

If the operation by the user is a selection of a candidate button (S122: NO, S126: YES), a usage parameter to be inputted to an input field corresponding to the candidate button is obtained from the PC 10_1 itself or another PC 10, the obtained usage parameter is inputted to the input field (S128) and thereafter the process returns to the step S120. In the step S128, inquiry data (for inquiring the usage parameter to be inputted to the input field corresponding to the selected candidate button) is transmitted to the PC 10 having the IP address, which has been set in the aforementioned "source variable" in the step S108 or S112 (see an arrow E in FIG. 3) and the usage parameter sent back from the PC 10 in response to the inquiry is obtained (see an arrow F in FIG. 3). In this case, if only one usage parameter is obtained, the obtained usage parameter is inputted to the input field. If a plurality of usage parameters are obtained, a candidate selection screen like the one shown in FIG. 8 is displayed so as to let the user select one of the obtained usage parameters as the candidate (and press the "OK" button), and the selected usage parameter is inputted to the input field. FIG. 8 shows a case where a plurality of IP addresses of the primary DNS server (a plurality of different usage parameters) are obtained. Incidentally, in cases where the initial value "0" has been set in the source variable at the point of the step S128 (i.e. in cases where the registration of the IP address in the step S108 or S112 has not been executed yet), the usage parameter is obtained by reading a usage parameter (which has been set to the PC 10_1 itself) from a storage area of the hard disk 14 storing the usage parameter.

If the operation by the user is a selection of a candidate batch display button (S126: NO, S130: YES), all the usage parameters to be inputted to input fields corresponding to all the candidate buttons on the n-th (n: arbitrary natural number) screen (currently displayed on the display unit 17) are obtained from the PC 10_1 itself or another PC 10, the obtained usage parameters are inputted to the input fields (S132) and thereafter the process returns to the step S120. In the step S132, the usage parameters to be inputted to the input fields corresponding to all the candidate buttons on the n-th screen are obtained by transmitting inquiry data based on the source variable, similarly to the step S128. Also in this step, if a plurality of usage parameters to be inputted to an input field (corresponding to a candidate button on the n-th screen) are obtained, a candidate selection screen like the one shown in FIG. 8 is displayed so as to let the user select one of the obtained usage parameters as the candidate. In cases where the initial value "0" has been set in the source variable at the point of the step S132, the usage parameters are obtained by reading usage parameters (which has been set to the PC 10_1 itself) from corresponding storage areas. Incidentally, it is preferable that the steps S128 and S132 be configured not to display parameters inappropriate for the setting target printer 20 (e.g. an IP address of a DNS server operating according to IPv4 when the setting target printer 20 operates according to IPv6) on the screen, by which useless and invalid parameter setting can be avoided.

If the operation by the user is a selection of a tab for switching the setting screen (S130: NO, S134: YES), the process returns to the step S116, in which the inquiry data (inquiring the setting information corresponding to the screen to be displayed in the next step S118 (screen corresponding to the selected tab)) is transmitted to the setting target printer 20 as explained above. Thereafter, the setting screen corresponding to the selected tab is displayed (S118).

After the process between the steps S116 and S134 is repeated several times, if the operation by the user in the step S120 is the pressing the "OK" button on any one of the setting screens (S134: NO, S136: YES), setting instruction data (for instructing the setting target printer 20 to set the usage parameters, which have been inputted to the input fields of all the setting screens) is transmitted to the setting target printer 20 (S138) and thereafter the setting screen display process of FIG. 2 is ended. The setting target printer 20 receiving the setting instruction data (see an arrow G in FIG. 3) sets the usage parameters to itself or updates usage parameters already set to itself based on the setting instruction data, and thereafter transmits setting completion data (indicating that the setting or update of the usage parameters has been completed) to the PC 10_1 (see an arrow H in FIG. 3). Incidentally, while the setting screen display process of FIG. 2 is ended after the transmission of the setting instruction data, it is also possible to configure the setting screen display process to return to the step S102 after the transmission of the setting instruction data (S138) in order to repeat the setting instruction for a plurality of setting target printers 20.

If the operation by the user in the step S120 is an operation other than the aforementioned operations (S134: NO, S136: NO), a process corresponding to the operation (other process) is executed (S140) and thereafter the process returns to the step S120. While the setting screen display process explained above is actually configured to delete the setting screen and the list screen and return to the step S102 when a "Cancel" button on any one of the setting screens is pressed, detailed explanation of the operation (not important for understanding the present embodiment) is omitted here.

<PC Search Process by PC 10_1>

In the following, the procedure of the PC search process, which is executed in the step S112 of FIG. 2 will be described referring to a flowchart of FIG. 9.

Figure 10A:
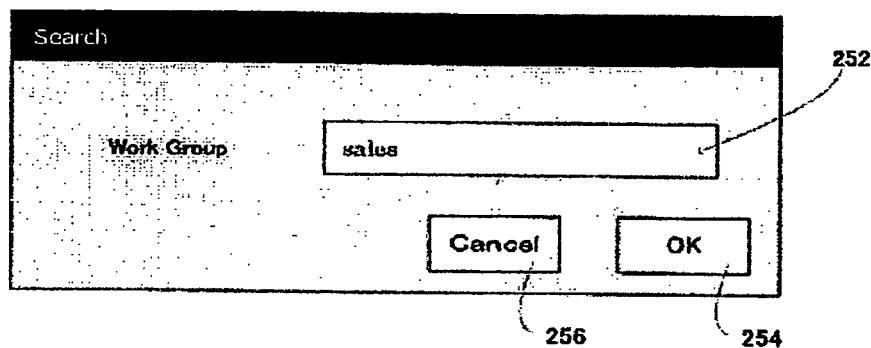

First, a group input screen (for allowing the user to input (a group name of) a group of PCs 10 to be searched for) is displayed on the display unit 17 (S212). In this embodiment, each device is assigned a group on the network (Work Group) to which the device belongs. In the step S212, the group input screen like the one shown in FIG. 10A, including an input field 252 for inputting (the group name of) the group of PCs 10 to be searched for, an "OK" button 254 for confirming the entry in the input field 252, etc., is displayed. After the group input screen is displayed, the user can perform an operation for inputting a group name to the input field 252 and confirming the entry as the group to be searched for (pressing the "OK" button 254), an operation for pressing a "Cancel" button 256, etc.

After the displaying of the group input screen in the step S212, the CPU 11 waits until the input unit 18 is operated by the user (S214: NO). When an operation by the user is detected (S214: YES), whether the operation is an entry of a group name in the input field 252 or not is judged (S216). If the operation is an entry of a group name (S216: YES), the entry (entered group name) is displayed (incorporated) in the input field 252 (S218) and thereafter the process returns to the step S214.

If the operation by the user is the pressing of the "Cancel" button 256 on the group input screen (S216: NO, S220: NO), the group input screen is deleted (S222), the PC search process of FIG. 9 is ended, and thereafter the process returns to the step S104 of FIG. 2.

Figure 10B:
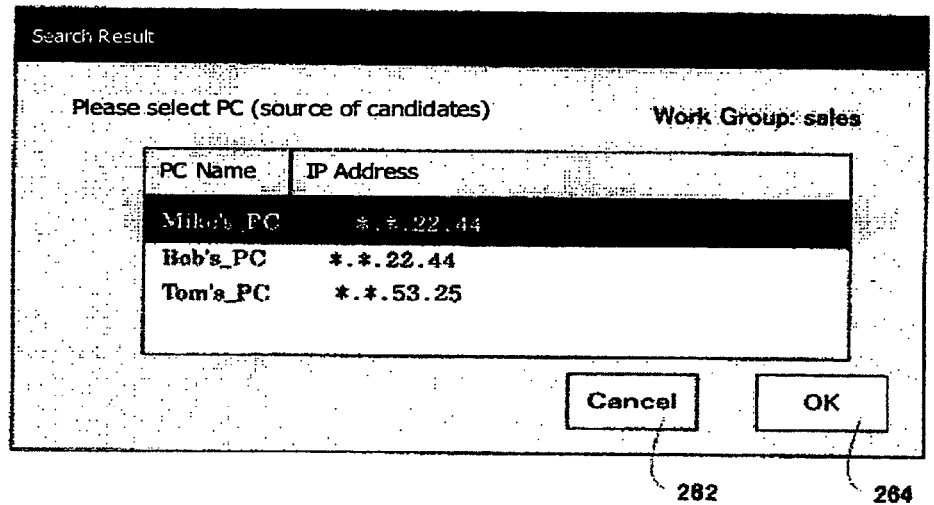
FIG. 10B is a schematic diagram showing a search result screen displayed in the PC search process in accordance with aspects.

If the operation by the user is the pressing of the "OK" button 254 on the group input screen (S216: NO, S220: YES), the network is searched for the PCs 10 belonging to the group having the group name currently inputted to the input field 252, and the result of the search is displayed on the display unit 17 (S224). In this step, request data (for requesting information such as the device name (Node Name) of each PC 10 and the IP address assigned to each PC 10) is transmitted (broadcast or multicast) to the PCs 10 of the group having the group name currently inputted to the input field 252. Information received from the PCs 10 in response to the request data is collected for a prescribed time period and thereafter a search result screen, listing the received information with respect to each PC 10 (each PC name), is displayed on the display unit 17 as shown in FIG. 10B. After the search result screen is displayed as above, the user can perform an operation for pressing a "Cancel" button 262, an operation for designating one of the PCs 10 displayed on the search result screen and pressing an "OK" button 264, etc. through the input unit 18.

After the displaying of the search result screen in the step S224, the CPU 11 waits until the input unit 18 is operated by the user (S226: NO).

When an operation by the user is detected (S226: YES), whether the operation is designation of one of the PCs 10 displayed on the search result screen or not is judged (S228). If the operation is the designation of a PC 10 (S228: YES), the entry (designation) is displayed (incorporated) in the search result screen (the PC 10 designated on the search result screen is displayed in a different color (black in FIG. 10B)) (S230) and thereafter the process returns to the step S226.

If the operation by the user is the pressing of the "Cancel" button 262 (S228: NO, S232: NO), the search result screen is deleted and thereafter the process returns to the step S214.

If the operation by the user is the pressing of the "OK" button 264 (S228: NO, S232: YES), the IP address of the PC 10 currently designated (displayed in a different color) on the search result screen is registered (S236), the PC search process of FIG. 9 is ended, and thereafter the process returns to the step S104 of FIG. 2. The registration in the step S236 is executed by setting the IP address of the designated PC 10 in the source variable.

<Network Print Process>

Figure 11:
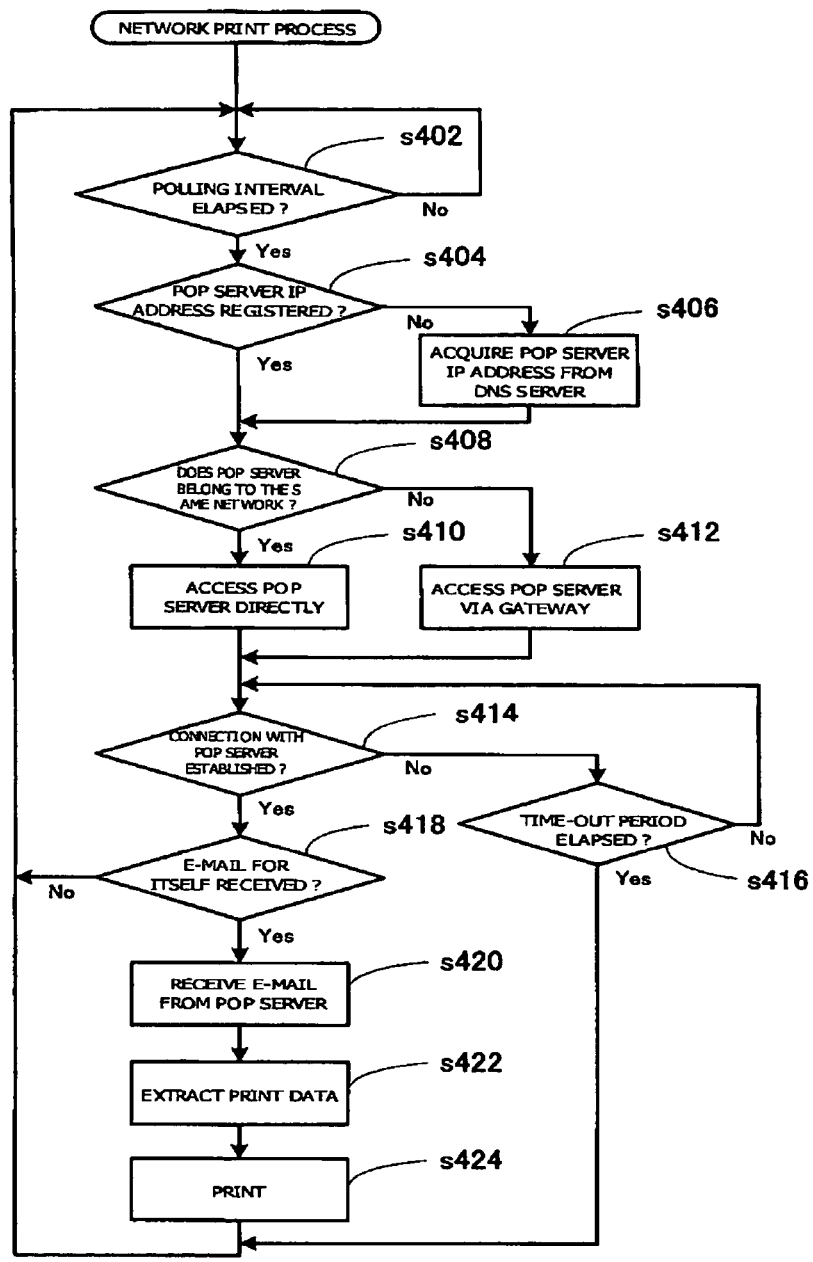
FIG. 11 is a flowchart showing the procedure of a network print process in accordance with aspects.

In the following, the procedure of a network print process executed by a printer 20 having the aforementioned network print function will be described referring to a flowchart of FIG. 11. The network print process is executed repeatedly after the printer 20 having the network print function is started up.

First, the printer 20 waits until a prescribed polling interval (of polling from a POP server) elapses (S402: NO). In this embodiment, the printer 20 is configured to make access to a POP server (the mail server 40 in this embodiment) at prescribed intervals in order to check whether or not an e-mail for the printer 20 itself has come. In the step S402, the printer 20 waits until the interval (polling interval) elapses.

When the polling interval has elapsed (S402: YES), the printer 20 checks whether or not the IP address of a POP server has already been registered in the form of a character string in a format corresponding to the IP mode (IPv4 or IPv6) of the printer 20 itself (S404).

If no IP address of a POP server has been registered yet (S404: NO), the IP address is acquired from the DNS server 50 based on the server name of a POP server (S406) and thereafter the process advances to the next step S408. Meanwhile, if the IP address of a POP server has already been registered (S404: YES), the process directly advances to the step S408 skipping the step S406.

Subsequently, whether the POP server identified by the registered IP address or the IP address acquired in the step S406 belongs to the same network as the printer 20 itself or not is checked (S408). The check can be conducted by comparing a network address contained in the IP address of the printer 20 with that contained in the IP address of the POP server, for example.

If the POP server belongs to the same network as the printer 20 itself (S408: YES), the printer 20 directly makes access to the POP server (S410), otherwise (S408: NO) the printer 20 makes access to the POP server via the gateway 30 (S412).

Subsequently, the printer 20 waits until the connection with the POP server is established (within a prescribed time-out period) (S414: NO, S416: NO). If the time-out period elapses without the establishment of the connection (S416: YES), the process returns to the step S402. If the connection with the POP server is established within the prescribed time-out period (S414: YES), whether or not an e-mail for the printer 20 itself has been received by the POP server (S418).

If no e-mail for the printer 20 itself has been received by the POP server (S418: NO), the process returns to the step S402. If an e-mail for the printer 20 itself has been received by the POP server (S418: YES), the printer 20 receives the e-mail from the POP server (S420).

Subsequently, print data is extracted from the received e-mail (S422) and an image specified by the extracted print data is printed out by the printing unit 28 (S424). Thereafter, the process returns to the step S402.

Figure 2:
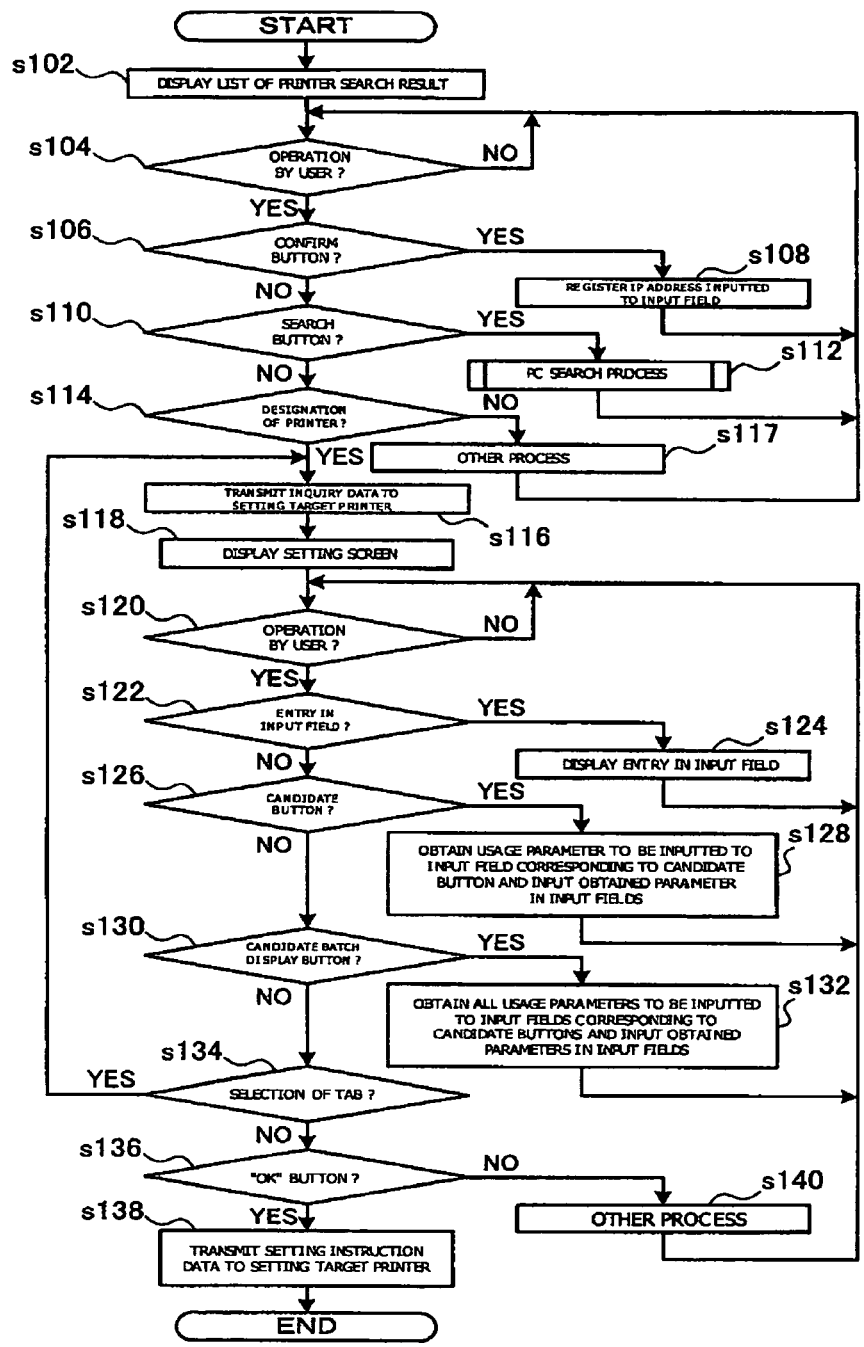
FIG. 2 is a flowchart showing the procedure of a setting screen display process in accordance with aspects.

In the network system configured as above, the PC 10_1 is capable of reporting (displaying) candidate usage parameters by entering them in the input fields in the step S128 or S132 of FIG. 2. The usage parameters reported in the step S128 or S132 are parameters obtained from another PC 10, that is, usage parameters, which have been set to the PC 10. Therefore, not only the usage parameters regarding the source and destination of communication data (as in the conventional techniques) but also any types of usage parameters for using other functions, which have been set to the PC 10 can be reported as the candidate usage parameters.

The usage parameters reported are parameters that have actually been set to the PC 10. Therefore, by setting the usage parameters to the setting target printer 20, functions usable with the parameters can securely be made available.

In the setting of the usage parameters based on the setting screens displayed in the step S118 of FIG. 2, a usage parameter as a candidate is entered in each input field when the user selects a candidate button or candidate batch display button. Therefore, the user can let the candidate usage parameter be selectively entered in the input field without the need of directly (manually) inputting the usage parameter into the input field, by which the usage parameters obtained from the PC 10 can be entered in the input fields easily and correctly. In the step S132, the candidate usage parameters can be automatically inputted to all corresponding input fields on each setting screen by selecting the candidate batch display button, by which the user can let all the candidate usage parameters be entered in the input fields without the need of inputting each usage parameter into each input field.

After inputting the usage parameters to the input fields as above, the user can issue the setting instruction (for setting the usage parameters) to the printer 20 (setting target printer) by the simple operation of pressing the "OK" button (S138 of FIG. 2).

When a plurality of candidate usage parameters are obtained for one input field in the step S128 or S132 of FIG. 2, the candidate selection screen like the one shown in FIG. 8 is displayed, by which the user can select one of the candidate usage parameters and let the selected candidate be entered in the input field.

In the step S128 or S132 of FIG. 2, if no PC 10 has been registered yet as the source of usage parameters by the step S1108 or S1112 (i.e. when the source of usage parameters is the PC 10_1 itself, which is executing the network management program), the PC 10_1 is capable of obtaining usage parameters that have already been set to itself and report the obtained usage parameters as the candidate usage parameters to be set to the setting target printer 20.

On the other hand, if a PC 10 has already been registered by the step S108 or S112 (i.e. when the source of usage parameters is a PC 10 other than the PC 10_1 executing the network management program) in the step S128 or S132 of FIG. 2, the PC 10_1 is capable of obtaining usage parameters that have already been set to the PC 10 and report the obtained usage parameters as the candidate usage parameters to be set to the setting target printer 20.

The PC 10 as the source of usage parameters can arbitrarily be set by the user by designating the PC 10 in the input field 102 of the list screen of FIG. 4 (and pressing the "Confirm" button 104) or by allowing the PC 10_1 to execute the PC search process (FIG. 9) by pressing the search button 106, by which the usage parameters can be obtained from the PC 10.

In the PC search process (executed by pressing the search button 106 of the list screen), the PC 10 as the source of usage parameters is designated from PCs 10 capable of data communication with the PC 10_1 via the network, by which the user is prevented from erroneously designating a PC 10 incapable of data communication. Further, the PC 10_1 executing the PC search process lets the user input a group name in the step S212 of FIG. 9 and searches for particular PCs 10 belonging to a group having the group name. By narrowing down the targets of search to a group, detection of an unnecessarily large number of PCs 10 can be prevented.

Among the setting screens displayed in the step S118 of FIG. 2, the seventh screen is a single screen having input fields for inputting the usage parameters acquired from the PC 10. Since the usage parameters acquired from the PC 10 can be entered in the input fields on the single screen in the steps S128 and S132, the user can easily check all the candidate usage parameters at a glance without the need of switching the screen, by which high operability can be offered to the user. Further, since the seventh screen has the input fields corresponding to various types of usage parameters, the operation of inputting the usage parameters to corresponding input fields can be carried out with ease, by which still higher operability is provided to the user.

The PC 10 regarded as the source of usage parameters in the steps S128 and S132 of FIG. 2 can be selected arbitrarily by the user from the PC 10_1 executing the network management program and other PCs 10, by executing or skipping the registration of a PC 10 in the step S108 or S112. Since the process executed by the network management program changes depending on the selection, it is unnecessary to prepare different network management programs for different types of PCs 10.

In the step S138 of FIG. 2, the setting instruction can be issued to a printer 20 selected from the listed printers 20 (displayed in the list screen in the step S102) in the step S114. The printers 20 listed in the list screen are those found as printers 20 capable of data communication with the PC 10_1 in the step S102; therefore, the user is prevented from erroneously selecting a printer 20 incapable of data communication <Modifications>

While a description has been given above of a preferred embodiment in accordance with aspects of the present invention, the present invention is not to be restricted by the particular illustrative embodiment and a variety of modifications, design changes, etc. are possible without departing from the scope and spirit of the present invention described in the appended claims.

For example, while the device (network device) to which the setting instruction is issued by the network management program is a printer 20 in the above embodiment, the device receiving the setting instruction is not restricted to printers but can be any device to which the usage parameters already set to a PC 10 can be set. For instance, the device may include a copier, a facsimile device, a scanner, a point of sale device, and a terminal that relies on another processing for content.

While only one PC 10 (PC 10_1) in the network system executes the network management program in the above embodiment, it is also possible to configure a system (network management system) including a plurality of devices (e.g. PCs 10_1 and 10_2) each of which executes part of the network management program. In this case, the devices of the network management system are configured to communicate with one another so as to cooperatively execute the network management program similarly to the above embodiment.

While each candidate usage parameter (also referred to as a "candidate") is reported by entering the candidate in a corresponding input field when the user presses the candidate button or the candidate batch display button on the setting screen in the above embodiment, the reporting of each candidate usage parameter can also be conducted by displaying the candidate in another display area in the vicinity of the corresponding input field. With such a configuration, the user can perform the operation for inputting the usage parameter (manual input of the parameter, copy & paste of the displayed usage parameter, etc.) correctly while checking the usage parameter displayed in the display area. It is also possible to configure the network management program to previously enter the candidate usage parameters in corresponding input fields, leaving out the candidate buttons and the candidate batch display buttons on the setting screens.

While each candidate usage parameter is entered in a corresponding input field when the candidate button or the candidate batch display button on the setting screen is pressed by the user (step S126 or S130 of FIG. 2) in the above embodiment, the network management program may also be configured to restore the corresponding input field to its original state (with no usage parameter entered therein) when the candidate button corresponding to the occupied input field is pressed again. It is also possible to change the appearance of the candidate button when it is pressed. For example, when the candidate button is pressed, the name of the button displayed thereon may be changed from "Candidate" to "Restore" while entering the candidate usage parameter in the corresponding input field.

Figure 9:
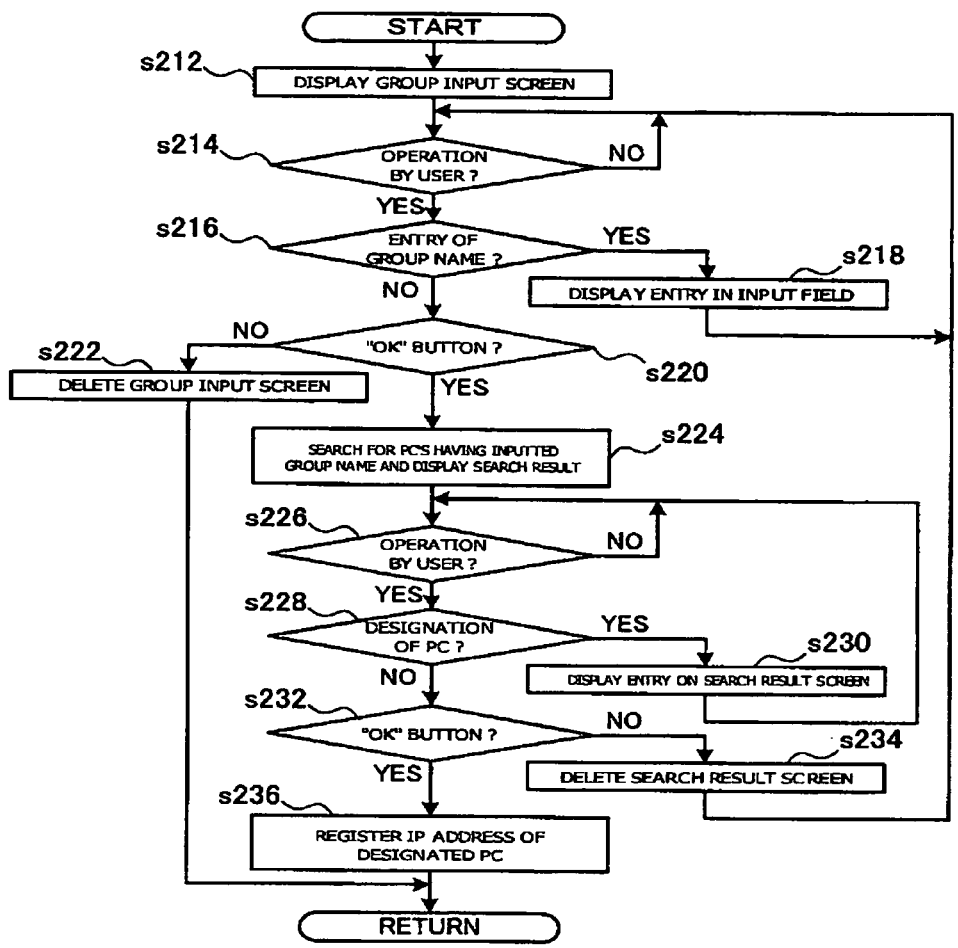
FIG. 9 is a flowchart showing the procedure of a PC search process in accordance with aspects.

While the process between the steps S212-S224 of FIG. 9 is configured in the above embodiment to receive an entry of a group name from the user and narrow down the PCs 10 (as search targets) based on the group name, the condition inputted by the user for narrowing down the PCs 10 is not limited to the group name. For example, the PCs 10 as the search targets can also be narrowed down by allowing the user to input a device name, etc. In the step S224 of FIG. 9, the target of the search may be restricted to PCs 10 in a broadcast domain to which the PC 10_1 belongs (PCs 10 within a domain to which broadcast packets from the PC 10_1 can be delivered).

In the above embodiment, the setting information is obtained from the setting target printer 20 by the inquiry of the step S116 of FIG. 2 and thereafter a setting screen having the candidate buttons (corresponding to the input fields on the screen) is displayed in the step S118 irrespective of whether each usage parameter has already been set to the setting target printer 20 or not (which can be judged from the setting information supplied from the setting target printer 20). In other words, when the candidate button or candidate batch display button is pressed in the step S128 or S132 of FIG. 2, a candidate usage parameter is reported (displayed in a corresponding input field) even when the usage parameter corresponding to the candidate button or candidate batch display button has already been set to the setting target printer 20. If the usage parameters already set to the setting target printer 20 are overwritten and reset with different usage parameters reported as the candidates as above, functions that have been available in the setting target printer 20 can be disabled. In order to avoid such trouble, the network management program may be configured to specify whether each usage parameter has already been set to the setting target printer 20 or not.

Specifically, when the response to the inquiry of the step S116 of FIG. 2 regarding each input field of the n-th setting screen (n: arbitrary natural number) is not the aforementioned void parameter, etc. nor the initial value of the device, the network management program may judge and recognize that the usage parameter corresponding to the input field has already been set to the setting target printer 20 and thereby display the n-th setting screen in the step S118 without indicating the candidate button corresponding to the input field (or indicating the candidate button in an inactive state so that it can not be pressed). In this case, input fields corresponding to usage parameters that are judged to have already been set to the setting target printer 20 are not provided with candidate buttons (or provided with candidate buttons in the inactive states), while input fields corresponding to usage parameters that are not judged to have been set to the setting target printer 20 are provided with candidate buttons in active states.

With such a configuration, the setting screen can be displayed in the step S118 while clearly specifying whether each usage parameter corresponding to each input field on the screen has already been set to the setting target printer 20 or not, by which the user is allowed to perform the inputting or setting of the usage parameters while correctly recognizing whether each usage parameter has already been set to the setting target printer 20 or not based on the appearance (mode) of each candidate button. Further, the steps S128 and S132 of FIG. 2 can be configured so that the candidates are reported only for usage parameters that are not judged to have been set to the setting target printer 20.

In this case, the "appearance" (mode) capable of specifying whether each usage parameter has already been set to the setting target printer 20 or not is not restricted to the appearance of each candidate button (e.g. whether or not to indicate each candidate button). For example, information (text, symbol, etc.) indicating whether each usage parameter has already been set or not may be directly displayed on the setting screen. Further, the network management program may also be configured to previously enter the usage parameters that have already been set to the setting target printer 20 in corresponding input fields, while totally leaving out the candidate buttons and the candidate batch display buttons.

While the judgment on whether each usage parameter has already been set to the setting target printer 20 or not is made in the above embodiment based on the response to the inquiry of the step S116 of FIG. 2, it is also possible to let the PC 10_1 inquire of the setting target printer 20 usage parameters that have not been set thereto (request a response indicating usage parameters that have not been set to the setting target printer 20) separately from the inquiry of the step S116 and recognize usage parameters indicated by the response as those that have not been set to the setting target printer 20.

While the setting instruction issued in the step S138 of FIG. 2 instructs the setting target printer 20 to set all the usage parameters entered in the input fields of all the setting screens in the above embodiment, the setting instruction may also be configured to instruct the setting target printer 20 to set part of the usage parameters corresponding to the IP mode of the printer 20 (i.e. depending on whether the printer 20 has been set to execute communication according to IPv4, IPv6 or both protocols). For this configuration, the step S138 of FIG. 2 can be replaced with a process shown in FIG. 12, for example.

Figure 12:
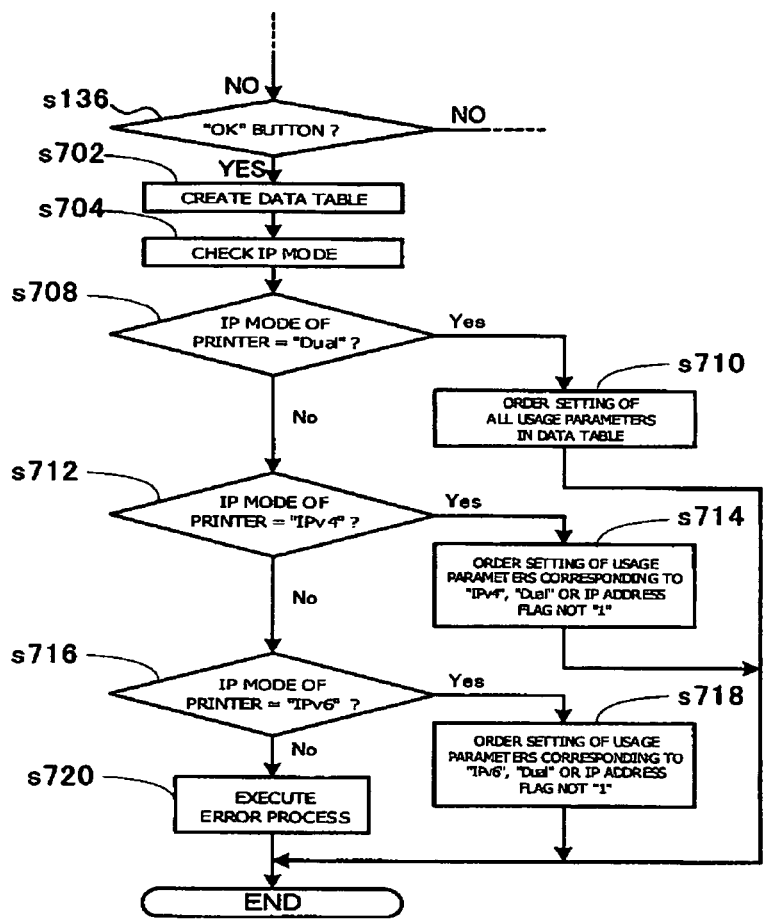
FIG. 12 is a flowchart showing a process executed at the end of the setting screen display process of FIG. 2 in another embodiment.

Referring to FIG. 12, in the case where the operation by the user in the step S120 is the pressing the "OK" button (S136: YES), a data table is generated regarding each of the usage parameters entered in the input fields of all the setting screens (S702). In the data table, a "setting target IP mode" (indicating whether each usage parameter is for IPv4 or IPv6 or supported by both protocols) and an "IP address flag" (indicating whether each usage parameter indicates an IP address or not (set to "1" when the parameter indicates an IP address)) are registered while being associated with each usage parameter.

Subsequently, the IP mode of the setting target printer 20 is checked (S704). In this step, inquiry data (inquiring the IP mode) is transmitted to the setting target printer 20. Notification data (indicating the IP mode of the printer) is sent back from the setting target printer 20 receiving the inquiry data, and the IP mode indicated by the notification data is recognized as the IP mode of the setting target printer 20. Incidentally, the checking of the IP mode can also executed by inquiring the IP mode together with other information in the inquiry of the step S116 of FIG. 2.

After the IP mode of the setting target printer 20 is determined as above, setting instruction data, ordering the setting of usage parameters corresponding to the IP mode determined in the step S704 (out of all the usage parameters registered in the data table), is transmitted to the setting target device (setting target printer 20).

Specifically, if the IP mode of the setting target printer 20 is "Dual" (S708: YES), setting instruction data, ordering the setting of all the usage parameters registered in the data table, is transmitted to the setting target device (setting target printer 20) so that such usage parameters will be set to (incorporated into) the setting target device (S710).

If the IP mode of the setting target printer 20 is "IPv4" (S708: NO, S712: YES), setting instruction data, ordering the setting of each usage parameter (registered in the data table) whose "setting target IP mode" is "IPv4" or "Dual" or whose "IP address flag" is not "1" (not indicating an IP address), is transmitted to the setting target device (setting target printer 20) so that such usage parameters will be set to (incorporated into) the setting target device (S714).

If the IP mode of the setting target printer 20 is "IPv6" (S712: NO, S716: YES), setting instruction data, ordering the setting of each usage parameter (registered in the data table) whose "setting target IP mode" is "IPv6" or "Dual" or whose "IP address flag" is not "1" (not indicating an IP address), is transmitted to the setting target device (setting target printer 20) so that such usage parameters will be set to (incorporated into) the setting target device (S718). If the IP mode of the setting target printer 20 is none of the above modes (S716: NO), an error process for dealing with the situation is executed (S720).

While the setting target printer 20 is instructed by the setting instruction to set all the usage parameters entered in the input fields of all the setting screens in the step S138 of FIG. 2 and thereby sets all the usage parameters designated by the setting instruction to itself in the above embodiment, the setting target printer 20 may also be configured to set part of the usage parameters (designated by the setting instruction) corresponding to the IP mode(s) that the setting target printer 20 has been set to be able to support. For this configuration, the setting instruction (step S138 of FIG. 2) is issued to designate the setting of each usage parameter while associating each usage parameter with the "setting target IP mode" and the "IP address flag" similarly to the data table generated in the step S702 of FIG. 12, and the setting target printer 20 receiving the setting instruction executes a setting incorporation process shown in FIG. 13, for example.

Figure 13:
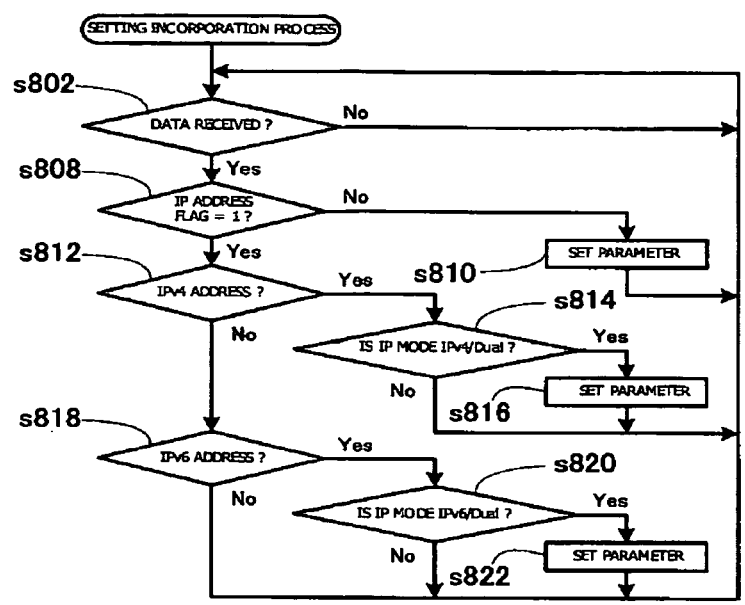
FIG. 13 is a flowchart showing the procedure of a setting incorporation process executed by a setting target printer in another embodiment.

Incidentally, the setting incorporation process of FIG. 13 shows a simple case where the setting instruction designates the setting of only one usage parameter. When the setting instruction designates the setting of two or more usage parameters, the process from step S808 of FIG. 13 is repeated for the usage parameters. Referring to FIG. 13, the setting target printer 20 first waits until setting instruction data is received (S802). When setting instruction data is received (S802: YES), the printer 20 checks whether the "IP address flag" associated with a usage parameter included in the setting instruction data is "1" or not (S 808). If the "IP address flag" is not "1", that is, if the usage parameter does not indicate an IP address (S808: NO), the printer 20 incorporates the usage parameter into its settings (sets the usage parameter to itself) (S810).

If the "IP address flag" associated with the usage parameter included in the setting instruction data is "1", that is, if the usage parameter indicates an IP address (S808: YES), whether the usage parameter indicating an IP address is a character string of the IPv4 format or not is checked (S812). When the usage parameter (IP address) is in the IPv4 format (S812: YES), the printer 20 incorporates the usage parameter into its settings (sets the usage parameter to itself) (S816) if the IP mode of the printer 20 itself has been set to "IPv4" or "Dual" (S814: YES). Thereafter, the printer 20 returns to the step S802. In other words, where data received via the network is a setting instruction data designating the setting of an IP address corresponding to IPv4 (S812: YES), the printer 20 returns to the step S802 without incorporating the usage parameter into its settings if the IP mode of the printer 20 itself has not been set to "IPv4" or "Dual" (S814: NO).

When the usage parameter is not in the IPv4 format (S812: NO), whether the usage parameter indicating an IP address is a character string of the IPv6 format or not is checked (S818). When the usage parameter (IP address) is in the IPv6 format (S818: YES), the printer 20 incorporates the usage parameter into its settings (S822) if the IP mode of the printer 20 itself has been set to "IPv6" or "Dual" (S820: YES). Thereafter, the printer 20 returns to the step S802. In other words, in the case where data received via the network is a setting instruction data designating the setting of an IP address corresponding to IPv6 (S818: YES), the printer 20 returns to the step S802 without incorporating the usage parameter into its settings if the IP mode of the printer 20 itself has not been set to "IPv6" or "Dual" (S820: NO).

What is claimed is:

1. A non-transitory computer program product having computer-readable instructions that cause a network management device, selected from one or more devices including one or more configured devices to which usage parameters have already been set, to execute a process for managing the usage parameters, wherein the usage parameters are necessary to be set to a setting target device before a function available via a network is available for use by the setting target device, the process comprising:

a parameter acquisition step of acquiring one or more usage parameters already set to one of the configured devices from the configured device; and a candidate reporting step of reporting the usage parameters acquired in the parameter acquisition step as candidates for one or more usage parameters to be set to a setting target device, wherein the setting target device has been connected to the network management device via the network so as to be capable of communication with the network management device, wherein the setting of the one or more usage parameters to the setting target device enables the functions available via the network to be available to the setting target device, wherein the setting target device is not the configured device, wherein the process further comprises a first source designation step that allows a user to designate whether the network management device or a device other than the network management device, which device is connected to the network management device to be capable of data communication via a network, should be selected as a source of the usage parameters acquired in the parameter acquisition step, wherein the parameter acquisition step acquires the one or more usage parameters by reading out the usage parameters from a storage area of the network management device if the network management device is selected as the source in the first source designation step, and wherein the parameter acquisition step requests the device other than the network management device to send back one or more usage parameters already set to the device and acquires the usage parameters sent back in response to the request if the device other than the network management device is selected as the source in the first source designation step.

2. The computer program product according to claim 1, wherein the process further comprises:

an input and instruction step that allows a user to input the usage parameters to be set to the setting target device and issue a setting instruction for instructing the setting target device to set the usage parameters thereto; and a setting instruction step executed when the setting instruction is issued in the input and instruction step, of instructing the setting target device to set the usage parameters inputted before the issuance of the setting instruction, wherein the usage parameters acquired in the parameter acquisition step are reported in the candidate reporting step as candidates for the usage parameters to be inputted by the user in the input and instruction step.

3. The computer program product according to claim 2, wherein the input and instruction step displays a setting screen, including input fields for inputting the usage parameters, on a display unit of the network management device, wherein the setting instruction step transmits instruction data, instructing the setting target device to set the usage parameters inputted to the input fields thereto, to the setting target device when an operation designating the setting of the inputted usage parameters to the setting target device is performed by the user after the setting window is displayed by the input and instruction step, and wherein the candidate reporting step executes the reporting of the candidates by allowing the setting screen displayed in the input and instruction step to have an appearance indicating that the usage parameters acquired in the parameter acquisition step are the candidates for the usage parameters to be inputted to the input fields.

4. The computer program product according to claim 3,
wherein a plurality of usage parameters already set to the configured device is acquired in the parameter acquisition step, and
wherein a setting screen including input fields for inputting the usage parameters acquired in the parameter acquisition step is displayed on the display unit in the input and instruction step.

5. The computer program product according to claim 2,
wherein the process further comprises a setting inquiry step of inquiring of the setting target device whether each usage parameter has been set thereto or not and about the already set usage parameters, and
wherein the input and instruction step allows the user to perform the inputting of the usage parameters and the issuance of the setting instruction in a mode capable of specifying whether or not each usage parameter to be inputted by the user is confirmed by the inquiry of the setting inquiry step to have already been set to the setting target device.

6. The computer program product according to claim 5,
wherein the candidate reporting step reports the usage parameters acquired in the parameter acquisition step and confirmed by the inquiry of the setting inquiry step to have not been set to the setting target device yet as the candidates for the usage parameters to be set to the setting target device when the input and instruction step allows the user to input the usage parameters.

7. The computer program product according to claim 2,
wherein the candidate reporting step reports each usage parameter acquired in the parameter acquisition step in a state in which the usage parameter can be selectively inputted automatically in response to an operation by the user when the input and instruction step allows the user to input the usage parameter.

8. The computer program product according to claim 2,
wherein the candidate reporting step reports one or more usage parameters acquired in the parameter acquisition step in a state in which the user can perform an operation for automatically inputting the usage parameters collectively when the input and instruction step allows the user to input the usage parameters.

9. The computer program product according to claim 1,
wherein the parameter acquisition step acquires the one or more usage parameters by reading out the usage parameters already set to the network management device from a storage area storing the usage parameters.

10. The computer program product according to claim 1,
wherein the parameter acquisition step requests a device other than the network management device to send back one or more usage parameters already set to the device and acquires the usage parameters sent back in response to the request.

11. The computer program product according to claim 10,
wherein the process further comprises a device search step of searching for other devices connected to the network management device to be capable of data communication via a network, and
wherein the source designation step allows the user to designate the device as the source of the usage parameters from the devices found by the device search step.

12. The computer program product according to claim 11,
wherein the devices connected to the network management device to be capable of data communication via a network are classified into groups according to a prescribed standard, and
wherein the device search step searches for devices belonging to a specific group out of the devices connected to the network management device to be capable of data communication via a network.

13. The computer program product according to claim 1,
wherein the process further comprises a second source designation step that allows the user to designate a device connected to the network management device to be capable of data communication via a network as the source of the usage parameters acquired in the parameter acquisition step.

14. The computer program product according to claim 1,
wherein the process further comprises a target designation step that allows the user to designate a device connected to the network management device to be capable of data communication via a network as the setting target device.

15. The computer program product according to claim 14,
wherein the process further comprises a target device search step of searching for other devices connected to the network management device to be capable of data communication via a network, and
wherein the target designation step allows the user to designate the setting target device from devices found by the target device search step.

16. A network management device executing a process for managing usage parameters necessary to be set to a setting target device before a function available via a network is available for use by the setting target device, wherein the process comprises:
 a parameter acquisition step of acquiring one or more usage parameters already set to a configured device from the configured device; and
 a candidate reporting step of reporting the usage parameters acquired in the parameter acquisition step as candidates for one or more usage parameters to be set to a setting target device,
wherein the setting target device has been connected to the network management device via the network so as to be capable of communication with the network management device,
wherein the setting of the one or more usage parameters to the setting target device enables the functions available via the network to be available to the setting target device,
wherein the setting target device is not the configured device,
wherein the process further comprises a first source designation step that allows a user to designate whether the network management device or a device other than the network management device, which device is connected to the network management device to be capable of data communication via a network, should be selected as a source of the usage parameters acquired in the parameter acquisition step,
wherein the parameter acquisition step acquires the one or more usage parameters by reading out the usage parameters from a storage area of the network management device if the network management device is selected as the source in the first source designation step, and
wherein the parameter acquisition step requests the device other than the network management device to send back one or more usage parameters already set to the device and acquires the usage parameters sent back in response to the request if the device other than the network management device is selected as the source in the first source designation step.

17. A network management system, comprising:
a network management device executing a process for managing usage parameters necessary to be set to a setting target device before a function available via a network is available for use by the setting target device, the process including:
a parameter acquisition step of acquiring one or more usage parameters already set to a configured device from the configured device; and
a candidate reporting step of reporting the usage parameters acquired in the parameter acquisition step as candidates for one or more usage parameters to be set to another device; and
a setting target device to which the one or more usage parameters are set by the network management device,
wherein the setting target device has been connected to the network management device via the network so as to be capable of communication with the network management device,
wherein the setting of the one or more usage parameters to the setting target device enables the functions available via the network to be available to the setting target device,
wherein the setting target device is not the configured device,
wherein the process further comprises a first source designation step that allows a user to designate whether the network management device or a device other than the network management device, which device is connected to the network management device to be capable of data communication via a network, should be selected as a source of the usage parameters acquired in the parameter acquisition step,
wherein the parameter acquisition step acquires the one or more usage parameters by reading out the usage parameters from a storage area of the network management device if the network management device is selected as the source in the first source designation step, and
wherein the parameter acquisition step requests the device other than the network management device to send back one or more usage parameters already set to the device and acquires the usage parameters sent back in response to the request if the device other than the network management device is selected as the source in the first source designation step.

18. A network management method for a network management device, selected from one or more devices including one or more configured devices to which usage parameters have already been set, for managing the usage parameters, wherein the usage parameters are necessary to be set to a setting target device before a function available via the network is available for use by the setting target device, the method comprising:
a parameter acquisition step of acquiring one or more usage parameters already set to one of the configured devices from the configured device; and
a candidate reporting step of reporting the usage parameters acquired in the parameter acquisition step as candidates for one or more usage parameters to be set to a setting target device,
wherein the setting target device has been connected to the network management device via the network so as to be capable of communication with the network management device,
wherein the setting of the one or more usage parameters to the setting target device enables the functions available via the network to be available to the setting target device,
wherein the setting target device is not the configured device,
wherein the method further comprises a first source designation step that allows a user to designate whether the network management device or a device other than the network management device, which device is connected to the network management device to be capable of data communication via a network, should be selected as a source of the usage parameters acquired in the parameter acquisition step,
wherein the parameter acquisition step acquires the one or more usage parameters by reading out the usage parameters from a storage area of the network management device if the network management device is selected as the source in the first source designation step, and
wherein the parameter acquisition step requests the device other than the network management device to send back one or more usage parameters already set to the device and acquires the usage parameters sent back in response to the request if the device other than the network management device is selected as the source in the first source designation step.

* * * * *